United States Patent
Landowski et al.

(10) Patent No.: US 10,608,966 B1
(45) Date of Patent: Mar. 31, 2020

(54) TECHNIQUES TO CUSTOMIZE BOT MESSAGING BEHAVIOR

(71) Applicant: Facebook, Inc., Menlo Park, CA (US)

(72) Inventors: Laurent Nicolas Landowski, Emerald Hills, CA (US); Stepan Parunashvili, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 86 days.

(21) Appl. No.: 15/920,970

(22) Filed: Mar. 14, 2018

Related U.S. Application Data

(60) Provisional application No. 62/486,262, filed on Apr. 17, 2017.

(51) Int. Cl.
| | |
|---|---|
| G06F 15/16 | (2006.01) |
| H04L 12/58 | (2006.01) |
| G06F 17/27 | (2006.01) |
| G06F 3/0482 | (2013.01) |

(52) U.S. Cl.
CPC .......... *H04L 51/02* (2013.01); *G06F 17/2785* (2013.01); *G06F 3/0482* (2013.01)

(58) Field of Classification Search
CPC ..... H04L 51/02; G06F 17/2785; G06F 3/0482
USPC ......................................................... 709/206
See application file for complete search history.

(56) References Cited

U.S. PATENT DOCUMENTS

| | | | | |
|---|---|---|---|---|
| 2012/0278164 | A1* | 11/2012 | Spivack | G06Q 10/10 705/14.52 |
| 2016/0092256 | A1* | 3/2016 | Jayachandran | G06F 9/45558 718/1 |
| 2017/0293922 | A1* | 10/2017 | Rosenberg | H04L 51/046 |

\* cited by examiner

*Primary Examiner* — Frantz B Jean

(57) ABSTRACT

Techniques to customize bot messaging behavior are described. In one embodiment, an apparatus may comprise bot setup component operative to receive a bot customization control directive at a page bot associated with a web page, the web page comprising a plurality of page fields; present a bot setting user interface in response to the control directive; receive a first control directive in the bot setting user interface to enable a response assistant component of the page bot; receive a second control directive in the bot setting user interface to enable a response to an intent; receive a customization setting in the bot setting user interface to modify the enabled response to the intent; and save the customization setting for the response assistant component. Other embodiments are described and claimed.

20 Claims, 25 Drawing Sheets

*— 302*      User Interface 300

| | |
|---|---|
| Page   Messages   Notifications   Publishing Tools   Insights | |
| General | Messaging Settings |
| Messaging | Set up how people can manage your page |
| Edit Page | Sections |
| Post Attribution | General Settings |
| Notifications | Response Assistant<br>Messaging Platform |
| Reminders | General Settings |
| Page Roles | Use the Return key to send messages    yes | no |
| People and Other Pages | *— 304*    *— 306*    *— 308* |
| Preferred Page Audience | Response Assistant |
| Partner Apps and Services | Smart Reply    yes | no    Settings |
| Ads | Send instant replies to anyone who messages your page    yes | no |
| Payments | |
| Activity Log | |

*FIG. 3*

User Request Communication System 100

User Interface 1500

Messenger Code  Response Assistant

Improve the experience and reduce the wait time with your Page's Response Assistant features.

Smart Reply
Automatically answer frequent questions from customers (e.g., open hours, location).

Instant Replies
Create an automatic response people receive when they message your page.

Away Messages
Create a message to let people know they've reached your outside of your business hours.

[ Setup Response Assistant ]

Maneki
Automatic Service Involved
< Back

Hello, I have a question.

*Setup Response Assistant Control 1510*

*FIG. 15*

User Interface 1600

| Page | Messages | Notifications | Publishing Tools | Insights |

| General |
|---|
| Messaging |
| Edit Page |
| Post Attribution |
| Notifications |
| Reminders |
| Page Roles |
| People and Other Pages |
| Preferred Page Audience |
| Partner Apps and Services |
| Ads |
| Payments |
| Activity Log |

Messaging Settings
Set up how people can manage your page

Sections

General Settings
Response Assistant
Messaging Platform

General Settings

Use the Return key to send messages    [yes] [no]

Response Assistant    ⟵ *1606*

Smart Reply    [yes] [no]    [Settings]

Send instant replies to anyone who messages your page    [yes] [no]

*FIG. 16*

*User Interface 1700*

| | | |
|---|---|---|
| Katie Candlemaker Tue<br>Hello<br>Jonathan Keyless Fri<br>Test | Katie Candlemaker<br><br>hi<br><br>Hello<br>Sent by SmartReply<br><br>hi<br><br>Thanks for messaging us. We try to be as responsive as possible. We'll get back to you soon.<br>Sent by SmartReply<br><br>Write a reply... | About<br>Local time 6:18 AM<br>Works at Faceplace<br>Studied at Rockefeller Scaife University<br>Lives in San Francisco, California<br>From Schuylkil, Pennsylvania<br>Labels<br>Add labels to help track and find conversations. Only admins can see labels.<br>Your Notes<br>Notes help you keep track of your conversations. Only admins can see notes. |

*Text Entry Field 1730*

*Interaction Testing Pane 1710*  *Information Pane 1720*

*FIG. 17*

User Interfaces 1800

User Interfaces 1900

US 10,608,966 B1

TECHNIQUES TO CUSTOMIZE BOT MESSAGING BEHAVIOR

RELATED APPLICATIONS

This application claims priority to U.S. Provisional Application Ser. No. 62/486,262, filed on Apr. 17, 2017 and entitled "TECHNIQUES TO CUSTOMIZE BOT MESSAGING BEHAVIOR." The contents of the aforementioned application are incorporated herein by reference.

BACKGROUND

Businesses, public figures, and other services may provide information and contact opportunities via a web page. Some forms of contact may be interactive and performed in real time. Web pages with high volumes of contact relative to a number of staff that is available to respond, or that receive the same queries repeatedly may benefit from some automation in responding to user messages, and in the ability to customize the automated responses.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to customize bot response behavior. Some embodiments are particularly directed to techniques to customizing what intents a bot responds to, and how to respond to particular intents. In one embodiment, for example, a method may comprise receiving a bot customization control directive at a page bot associated with a web page, the web page comprising a plurality of page fields; presenting a bot setting user interface in response to the control directive; receiving a first control directive in the bot setting user interface to enable a response assistant component of the page bot; receiving a second control directive in the bot setting user interface to enable a response to an intent; receiving a customization setting in the bot setting user interface to modify the enabled response to the intent; and saving the customization setting for the response assistant component. The method may further comprise composing message responses from the bot to provide notice to the message response recipient that the message response comes from a bot, and to provide calls to action for additional functionality. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates a first user interface for customizing a page bot.

FIG. 15 illustrates a second user interface for a page administrator.

FIG. 16 illustrates a third user interface for a page administrator.

FIG. 17 illustrates a messaging user interface for a page administrator.

DETAILED DESCRIPTION

Figure 1:
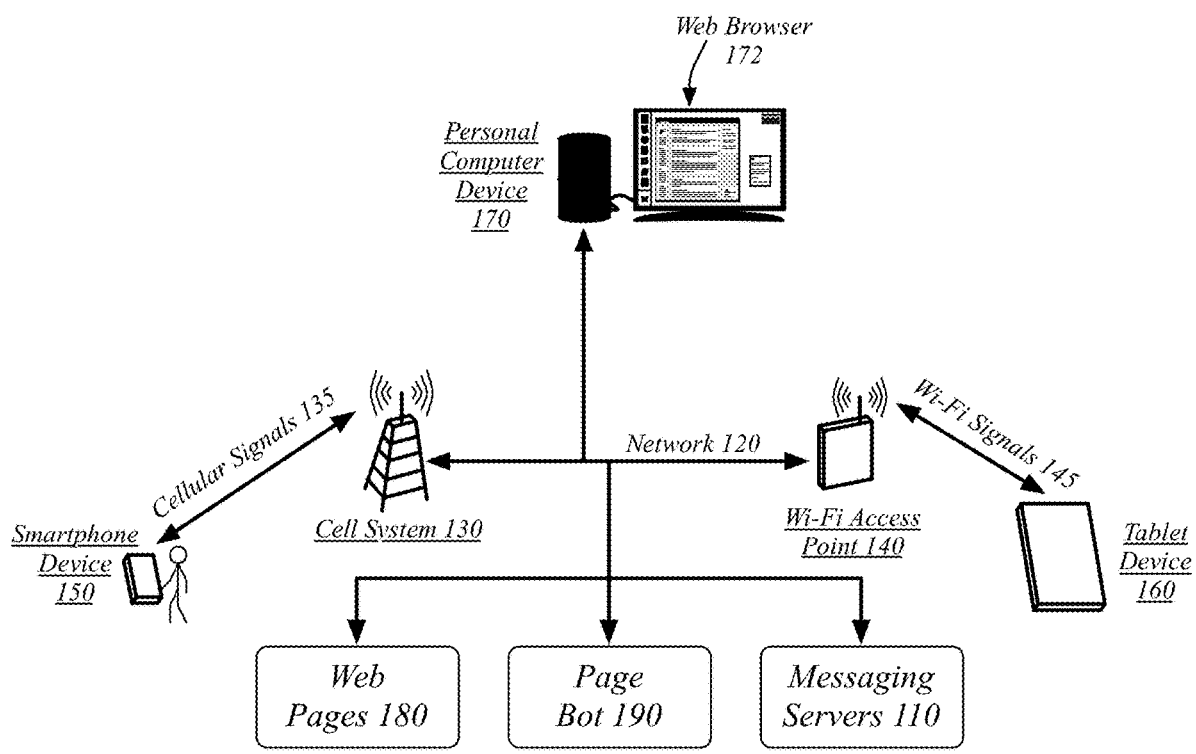
FIG. 1 illustrates an embodiment of a user request communication system.

Businesses and services with web pages accessible to their customers and clients, and/or having a presence in a social network, may offer several ways of contacting the business or service (collectively referred to herein as a "service"). In addition to providing telephone numbers and electronic mail addresses, many services also provide a way to communicate with a human agent through an instant message-like interface. However, staffing one or more human agents for live communication can be prohibitively expensive for smaller services.

Some of the human agent interactions can be performed by software applications known as bots. To aid a user in interacting with a service via a messaging context, services may be represented as messaging bots within the messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users. A messaging bot may have access to natural language processing components, machine learning components, databases, rules, and other resources that can allow the messaging bot to understand a human user request, select an appropriate response or action, and interact with the human user as though the messaging bot were human.

Creating a bot for a service conventionally needs a developer to write the program code or instructions of the bot. Additionally, a human developer may be needed to generate training data or a rule set for the bot to use. The bot may need to be hosted on a platform. Again, for some services, these elements may be prohibitively expensive.

Many services have a presence within a social network system and/or have a presence within a messaging system. For example, the service may have an account in the social network system and/or messaging system that allows other users of the systems to view information about the service and/or interact with messages. For some services, there may be limited time or attention available from the service owner or administrator to respond to messages, and many messages may address the same kinds of questions or issues.

When the service has a web page, many questions received through a messaging interaction may be answered from information on the web page. As such, a system that hosts the web page may provide a way for the service owner or administrator to automatically generate a messaging bot for the web page, referred to herein as a "page bot", and may enable the page bot to receive messages, access information on the web page, and respond to messages with the information. In particular, generating the page bot may require no programming or development experience from the web page owner or administrator. The page bot may be further customized by the web page owner or administrator to respond to specific types of messages and/or with specific language. Other customizations are also described herein.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a user request communication system 100. In one embodiment, the user request communication system 100 may comprise a computer-implemented system having software applications comprising one or more components. Although the user request communication system 100 shown in FIG. 1 has a limited number of elements in a certain topology, it may be appreciated that the user request communication system 100 may include more or fewer elements in alternate topologies as desired for a given implementation.

A bot application, possibly of a plurality of bot applications, may operate within a network environment including a messaging system empowering the exchange of messages and other information. The page bot 190 may comprise a software application executing on a computer system. The page bot 190 may use a messaging system to exchange messages comprising user messages and bot messages. User messages may comprise user requests and messages clarifying and specifying user requests. Bot messages may clarify requests for information relating to user requests and performance information relating to user requests. In some cases, the messaging system may comprise a general messaging system also used for other messages. In other cases, the messaging system may comprise a messaging system exclusive to communicating with bot applications such as page bots 190.

The messaging servers 110 may comprise one or more messaging servers operated by a messaging system as part of the user request communication system 100. A messaging server may comprise an Internet-accessible server, with the network 120 connecting the various devices of the user request communication system 100 comprising, at least in part, the Internet.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 160 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 170. The personal computer device 170 may comprise a Mac OS® device, Windows® device, Linux® device, or other computer device running another operating system. The personal computer device 170 may be an Ethernet device capable of connecting to a network 120 via an Ethernet connection. In some embodiments and in some cases the personal computer device 170 may additionally or alternatively use cellular, Wi-Fi, or other networking technologies to the network 120. The personal computer device 170 may execute a messaging client, web browser 172, or other local application to access the messaging servers 110.

The same user may own and operate a personal home assistant device (not shown). A personal home assistant device may comprise, for example, an ECHO device, or a HOME device, or any other device configured to receive human voice requests and commands and to access various network services in response thereto. A personal home assistant device may access messaging servers 110 and may interact with page bots 190.

Users may interact with web pages 180 through any of the example devices, in particular, via page bots 190 associated with the web pages 180. A web page 180 may include information about a business, government agency, network accessible service, product, community organization, a public figure, tourist attraction, and so forth. A web page 180 may be hosted, for example, within a social networking service, or may be hosted from other servers or services. While a web page 180 may be viewable, for example, with a web browser 172, or within a client application such as a social network client application, information on the web page 180 may also be accessible through a messaging format. A user may send messages to the web page 180. For example, a web page within a social network may include a call-to-action element on the web page that allows a user to begin and engage in a messaging conversation with the web page entity. When hosted by a third party, the web page may include a plug-in for the messaging service. A page bot 190 may respond to the messages on behalf of the web page 180, or on behalf of a human owner or administrator of the web page 180. The page bot 190 associated with a particular web page 180 may be able to access the information on the web page 180 in order to respond appropriately to a message. The entity represented by the web page 180 may be represented as a social-networking page, with the social-networking page identified with a social-networking page identifier uniquely identifying the entity and its page with the social-networking system. The web page 180 may have a messaging identity, such that the web page 180 is enabled to be sent messages by users of a messaging system. Web pages with a message identity may additionally have a messaging identifier associated with them, uniquely identifying the web page as a message recipient with the messaging system. Web pages may alternatively or additionally have one or more page bots 190 associated with them. Each page bot 190 has a unique bot identifier identifying the page bot. The bot identifier is associated with the page identifier of the web page 180 to associate the page bot with the page. In some embodiments, the bot identifier may also be used to identify the page bot for messaging. In other embodiments, each page bot may have a distinct bot identifier used to identify the bot for messaging. Within the messaging system, a message thread, e.g. a specific grouping of message recipients engaging in a messaging conversation, may be associated with a thread identifier, the thread identifier uniquely identifying the message thread with the messaging system. A bot may be authorized, such as a temporary authorization, to access a message thread through an association, which may also be temporary, between the bot identifier and the message thread identifier.

A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110. A messaging client may empower access to bot applications for the performance of services, such as where the bot applications are one of a plurality of endpoints and/or services accessible via the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

The user request communication system 100 may use knowledge generated from interactions in between users. The user request communication system 100 may comprise a component of a social-networking system and may use knowledge generated from the broader interactions of the social-networking system. As such, to protect the privacy of the users of the user request communication system 100 and the larger social-networking system, user request communication system 100 may include an authorization server (or other suitable component(s)) that allows users to opt in to or opt out of having their actions logged by the user request communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the user request communication system 100 and other elements of a social-networking system through blocking, data hashing, anonymization, or other suitable techniques as appropriate.

Figure 2:
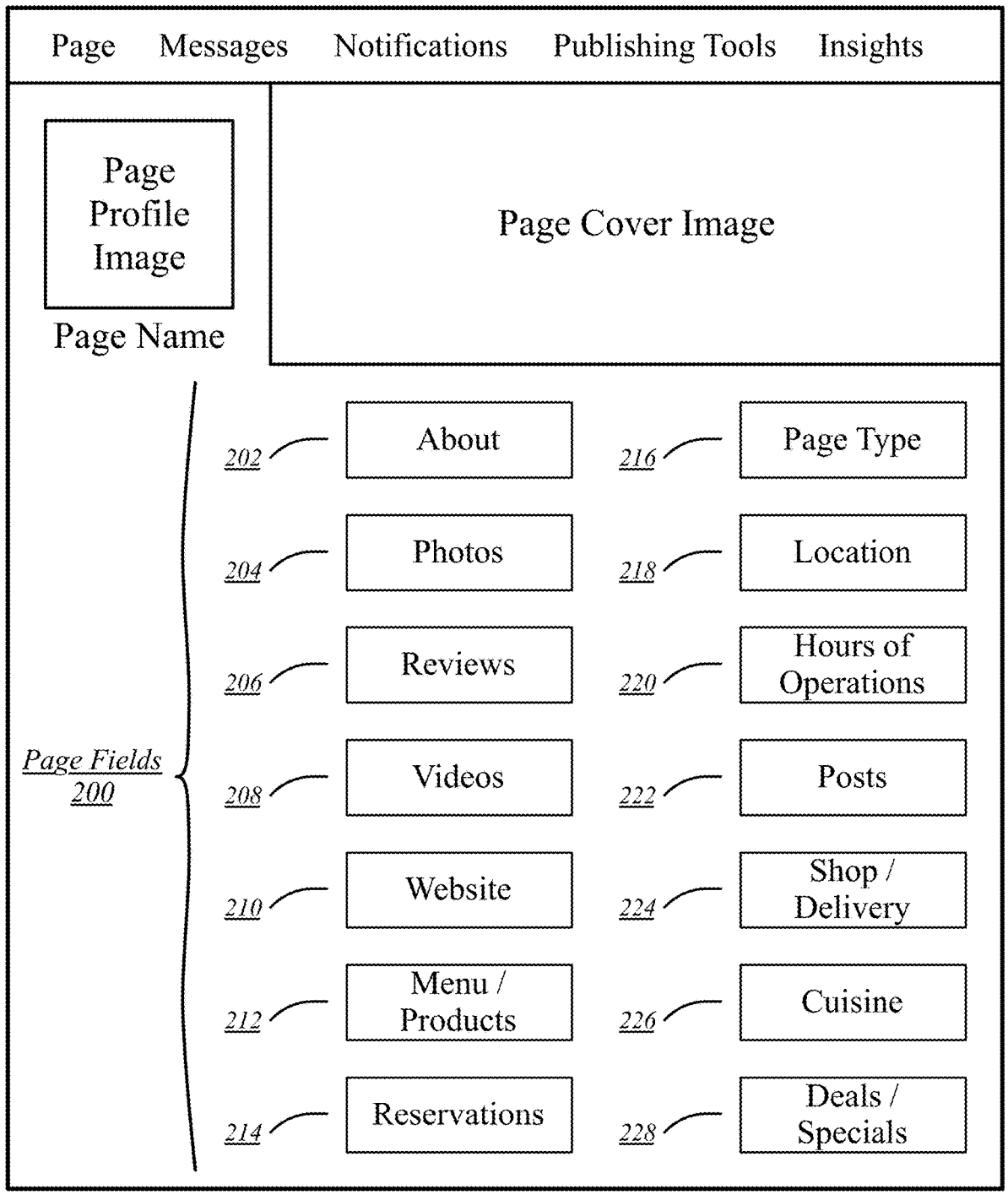
FIG. 2 illustrates an embodiment of a web page that may be associated with a page bot.

FIG. 2 illustrates an embodiment of a web page 280. The web page 280 may be an example of a web page 180. The web page 280 may be created by a human owner or administrator (referred to herein as the administrator) of the entity that the web page 280 will represent. Upon creation, the administrator may select one or more page fields 200 to include on the web page 280. The administrator may also select a page profile image and/or a page cover image to represent the entity visually. The administrator may enter or link information for some of the page fields, and may enable other page fields to receive information from users.

The page fields 200 present on a web page may be selected according to what information is available for the entity and what information is appropriate for the entity. The fields may include an about field 202. The about field 202 may include text that describes the entity in some way, such as what services are provided, who the owner is, how long the entity has existed, contact information, or any other information that may distinguish the entity from other similar entities.

The page fields may include a photo field 204. The photo field 204 may include one or more photographs or other images related to the entity. For example, if the entity is a product creating entity, the photos may include photos of the products. If the entity is a celebrity, the photos may include photos of the celebrity. The photo field 204 may contain photos uploaded to the page by the administrator, by other users, or both.

The page fields may include a reviews field 206. When used, the reviews field 206 may include one or more customer reviews of the entity, including ratings and comments.

The page fields may include a videos field 208. Similar to the photo field, the videos field 208 may include videos, for example, product demonstrations, public figure performances, instructional videos and the like. The videos may be uploaded to the page by the administrator, by other user, or both.

The page fields may include a website field 210. If the web page 280 is hosted within a social networking system, for example, the website field 210 may include a link to a publically accessible website for the entity.

The page fields may include a menu/products field 212. The menu/products field 212 may include information such as a listing of products available for sale by the entity, or a menu of food or beverage items, e.g. if the entity is a restaurant or bar.

The page fields may include a reservation field 214. The reservations field 214 may include information that allows a user to make a reservation for a meeting with the entity, e.g. a consultation or a restaurant reservation. The reservations field 214 may link to a third-party reservation system.

The page fields may include a page type field 216. The page type field 216 may include information that categorizes the entity represented by the web page 280. For example, page types may include: business, government agency, artist, celebrity, restaurant, charity, national park, and so forth.

The page fields may include a location field 218. The location field 218 may include a street or mailing address for the entity, or geolocation coordinates. The location field 218 may include a map view or a link to a map view.

The page fields may include an hours of operation field 220. The hours of operation field 220 may include the days of the week and times of the day when the entity is open for business or contact.

The page fields may include a posts field 222. The posts field 222 may include messages, text, images, or other information that the administrator and/or other users have added to the web page 280 that are not included in other fields. The posts field 222 may show some limited number of the most recent posts. Older posts may be viewable, for example, by scrolling down within the posts field 222, or by selecting a control feature to see older posts.

The page fields may include a shop/delivery field 224. When the entity engages in sales of any kind, the shop/delivery field 224 may include a link to an online storefront where a user can make selections of items and make payments. The link to the online storefront may link to a third-party service that provides the sales functionality.

The page fields may include a cuisine field 226. When the entity is a restaurant, the cuisine field 226 may include information about the type of food that the restaurant prepares.

The page fields may include a deal/specials field 228. The deals/specials field 228 may include information about promotions, coupons, price reductions, or other incentives to engage in business with the entity.

Some of the page fields 200 may be provided with every web page 280, while others may be enabled or disabled at the administrator's selection, for example, when the web page 280 is created, or at a later time. Once the administrator has selected one or more of the page fields to use for the web page 280, the administrator may enter information for each selected page field. The entered information may be presented to users who view the web page 280.

FIG. 3 illustrates a first user interface (UI) 300 for customizing a page bot for the web page 280. The UI 300 may be presented to the administrator, for example, in response to selecting a settings control element for messaging from the web page. The UI 300 may include a menu bar 302 that allows the administrator to navigate to different functions related to the web page 280.

The UI 300 may include a section 304 for configuring a response assistant for a page bot of the web page 280. The section 304 may include a toggle 306, or other selectable UI element, that allows the administrator to enable or disable the response assistant. As shown the response assistant is enabled. The section 304 may also include a settings UI element 308. The settings UI element 308 may, when selected, open a pane, window, page, or other UI to allow the administrator to configure and customize the response assistant.

Figure 4:
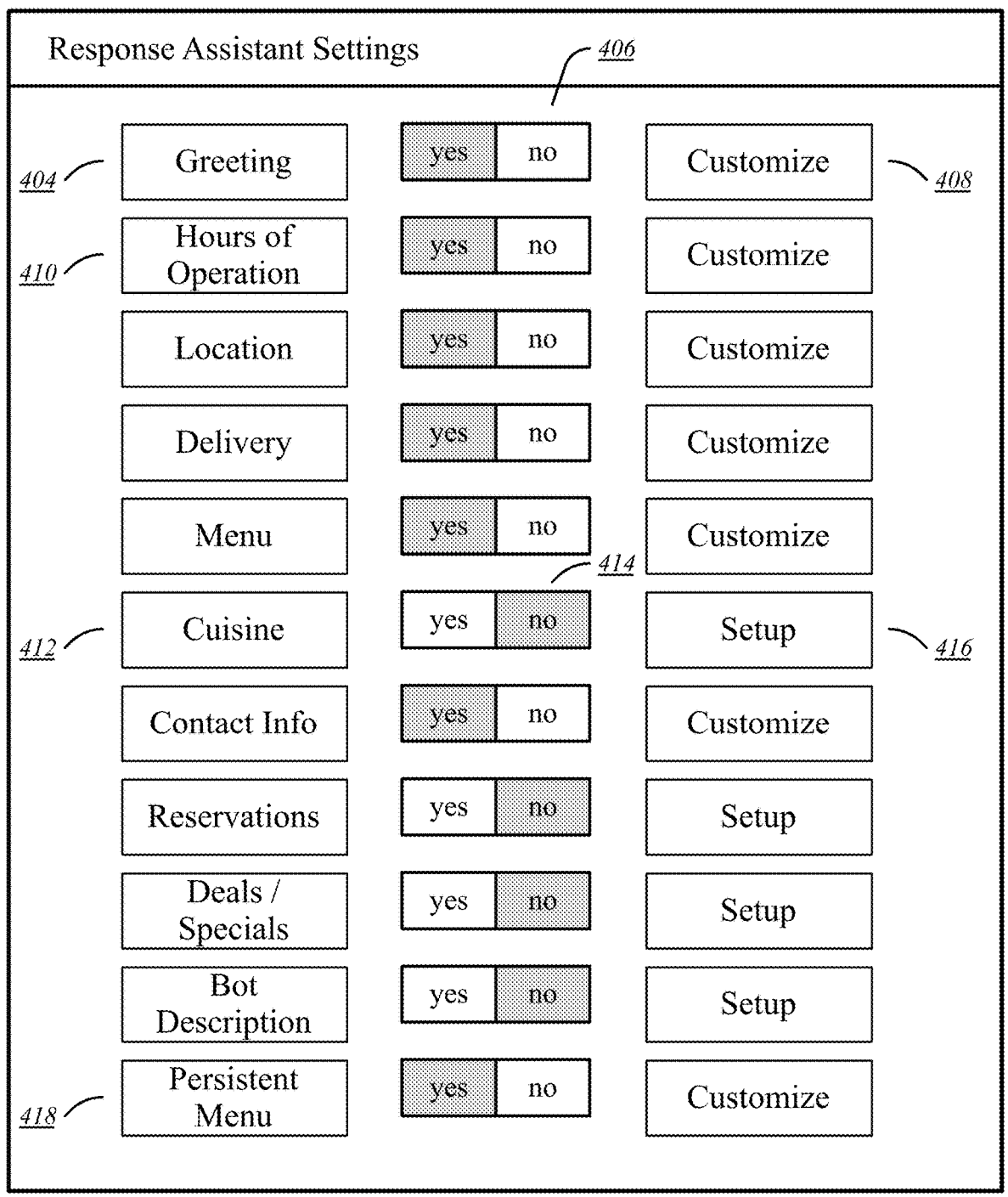
FIG. 4 illustrates a second user interface for customizing a page bot.

FIG. 4 illustrates a user interface 400 for customizing a page bot. The UI 400 may be presented to the administrator, for example, in response to selecting the settings UI element 308. The UI 400 may present a number of "intents" that the page bot may be able to respond to. An "intent", as used herein, may include a type or purpose of a message from a user. An intent may map to a specific page field. For example, an hours of operation intent 410 may map to the hours of operation field 220. An intent may not map to any specific page field. For example, a greeting intent 404 may represent opening statements received from users in messages that initiate a messaging conversation without requesting any information.

The administrator may be able to enable or disable automated responses to any intent presented in the UI 400. The intents presented in the UI 400 may correlate to enabled page fields 200. Each intent presented may include a toggle UI element, e.g. toggle 406 and 414, that enables the administrator to enable automated responses to the specific intent. For example, toggle 406 indicates that an automated response to a greeting intent is enabled, while the toggle 414 indicates that an automated response to a cuisine intent is disabled.

Intents that are enabled may also include a customize UI element, e.g. UI element 408. Selecting the UI element 408 may open another UI that allows the administrator to customize responses to the corresponding intent.

When an intent maps to a page field 200, and the corresponding page field 200 includes information within it, the intent in UI 400 may be enabled by default. When an intent maps to a page field 200 that does not have information within it or contains insufficient data for response purposes, the intent in UI 400 may be disabled by default. When the corresponding page field lacks information, the intent may be presented with a setup UI element, e.g. UI element 416. Selecting the UI element 416 may open a UI that allows the administrator to enter information for the corresponding page field.

In addition to presenting intents for response, the UI 400 may also include a setting for the use of a persistent menu 418. A persistent menu may be presented in a messaging interface to a user and may provide links to some of the page fields within the messaging interface regardless of any contents within a messaging conversation. The setting for the persistent menu 418 may also provide a toggle to enable or disable the use of the persistent menu, and a customize UI element to allow the administrator to select which items to include on the persistent menu.

Figure 5:
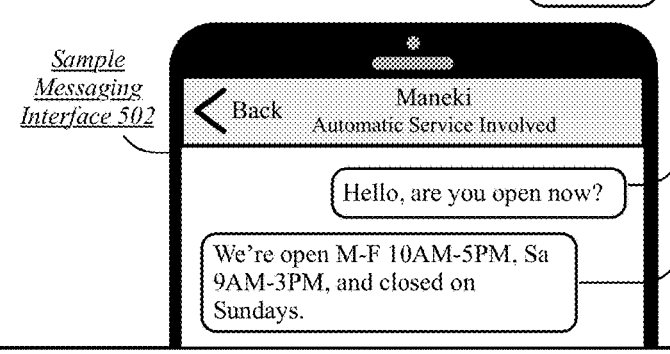
FIG. 5 illustrates a third user interface for customizing a page bot.

FIG. 5 illustrates a user interface 500 for customizing a page bot. The UI 500 may be presented, for example, when an administrator selects a customize UI element for an intent presented in the UI 400. As illustrated, the intent is the hours of operation 410 intent.

The UI 500 may present a sample messaging interface 502 that shows a portion of a messaging client interface for a messaging conversation between the page bot and a user. The sample messaging interface 502 shows a sample user message 504 that maps to the hours of operation intent, and the sample bot message 506 that the page bot will respond with.

The UI 500 may also present a customization pane 510 where the administrator can change the page bot's response for the relevant intent. The customization pane 510 may include, for example, a text editing field 512. The text editing field 512 may allow the administrator to change the wording of the message. In some embodiments, where the page field information is presented as phrases or numbers, the text editing field 512 may include variable fields that can be populated from the page field information and non-variable text. The non-variable text may serve, for example, to present the information in complete sentences, or to provide other context or tone to the information. When the administrator selects the save element, the text in the text editing field may be saved and used to respond to any user message mapping to the relevant intent.

Figure 6:
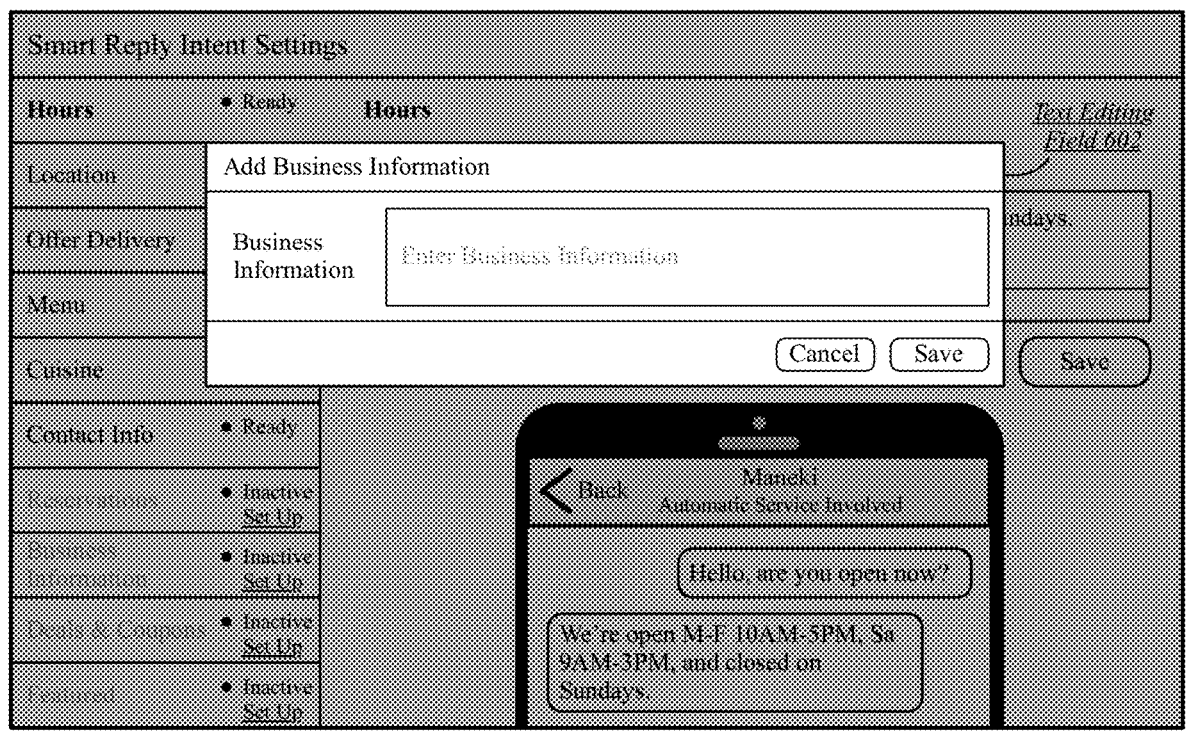
FIG. 6 illustrates a fourth user interface for customizing a page bot.

FIG. 6 illustrates a user interface 600 for customizing a page bot. The UI 600 may be presented to the administrator, for example, after a setup UI element, e.g. setup UI element 416, is selected in the UI 400. The UI 600 may present a text editing field 602. The administrator may enter text into the text editing field 602. The text may be simple text, formatted text, rich text, text that include links or references to web pages, network resources, files, scripts, and so forth. When saved, the contents of the text editing field 602 may be stored in the web page information in the relevant page field. In some embodiments, when the contents of the text editing field 602 are saved, the intent response for the page field may be automatically enabled in the UI 400.

Figure 7:
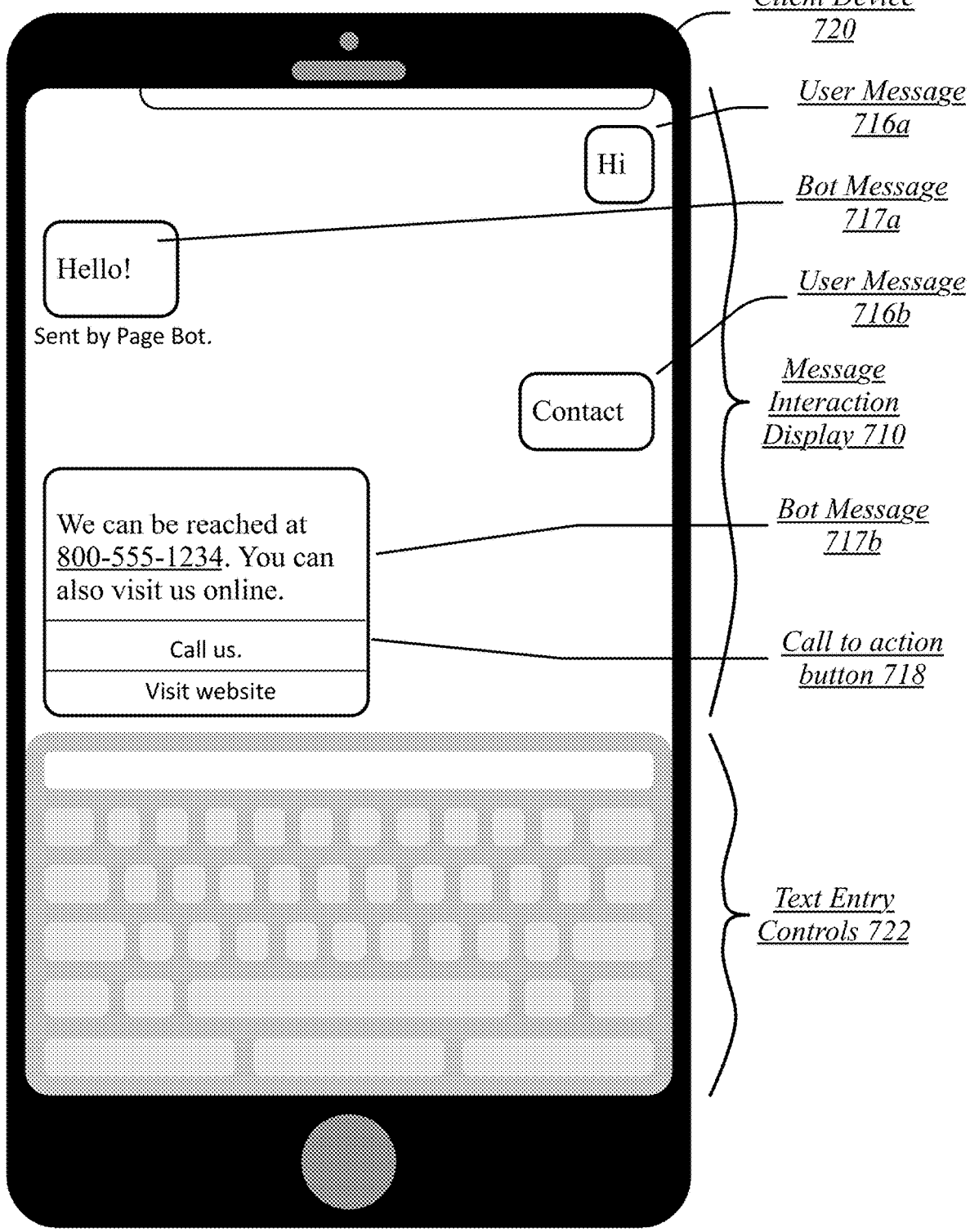
FIG. 7 illustrates a user interface for a user client interacting with a page bot.

FIG. 7 illustrates a user interface 700 for a user messaging client interacting with a page bot. The UI 700 may be presented on a client device 720. The client device 720 may correspond to, without limitation, a smartphone device 150, a personal computer device 180, a tablet device 160, a personal home assistant device, or any other form of client device. The UI 700 may be displayed via a web browser, such as may execute on a smartphone device 150, tablet device 160, personal computer device 180, or other device. The UI 700 may be displayed in a messaging application, such as may execute on a smartphone device 150, tablet device 160, personal computer device 180, or other device. The UI 700 may be displayed in an automated bot service application, such as may execute on a smartphone device 150, tablet device 160, personal computer device 180, or other device. When used with a personal home assistant device, the UI 700 may not be visually presented, but may instead be represented by audio data, e.g. spoken messages from the user, and text-to-speech audio data from the page bot. The UI 700 may be presented using a variety of techniques, without limitation to the examples listed here.

The UI 700 may include a message interaction display 710. A message interaction display 710 may comprise a series of messages exchanged between a user of the client device 720 and a page bot 190. A message interaction display 710 may include a user message 716 of a plurality of user messages. User messages may be displayed in association with an avatar for the user (not shown), or may be positioned on one side of the display. A message interaction display 710 may include a bot message 717 of a plurality of bot messages. Bot messages may be displayed in association with an avatar for the web page as corresponds to the page bot 190 (not shown), or may be positioned on an opposite side of the display with respect to the user messages. The message interaction display 710 may, in some cases, only visibly include a portion of the user messages and bot messages, such as due to limited screen space of the client device 720.

A client device 720 may include controls for operating the user interface 700. The controls may include text entry controls 722 empowering the entering of text for the composition of text-based messages. The controls may include hardware controls. In some embodiments, controls may be touchscreen-based controls.

As illustrated, the user messages, e.g. user message 716a, may include an intent, e.g. a greeting, a question, or a request for information. The intent can be answered with information available on the web page 180 that associated with the page bot 190 that is participating in the message interaction, or from the response assistant settings. The bot messages, e.g. bot message 717a, may include information retrieved from the web page 180 or the response assistant settings. For example, the user message 716a is a greeting. In response to that message, the page bot may determined the intent of the user message 716a to be a greeting, and may have used the response assistant setting for responding to a greeting to compose a message response as bot message 717a. In some embodiments, whenever a page bot responds to a user message, an indication that the bot message is sent from a bot, rather than a human operator, is provided. As shown, text below the bot message 717a states that the message was sent from the page bot. Other indications may be used, for example, different colors for human and bot responses, different avatars for human and bot, different fonts, different text styles, and so forth.

Other user messages may include a request for contact information, e.g. user message 716b, which may cause the page bot to retrieve information from an about field 202. Some bot messages, e.g. bot message 717b, may include one or more call to action buttons, e.g. call to action button 718, in addition to any response text. A call to action button may be a selectable UI element that, when selected with a control directive from the user, performs an action In the illustrated example, the bot message 717b includes the call to action button 718 which will place a phone call to the displayed phone number when selected. The bot message 717b also includes a call to action button that when selected, will open the page entity's web site, which may provide other contact mechanisms.

Figure 8:
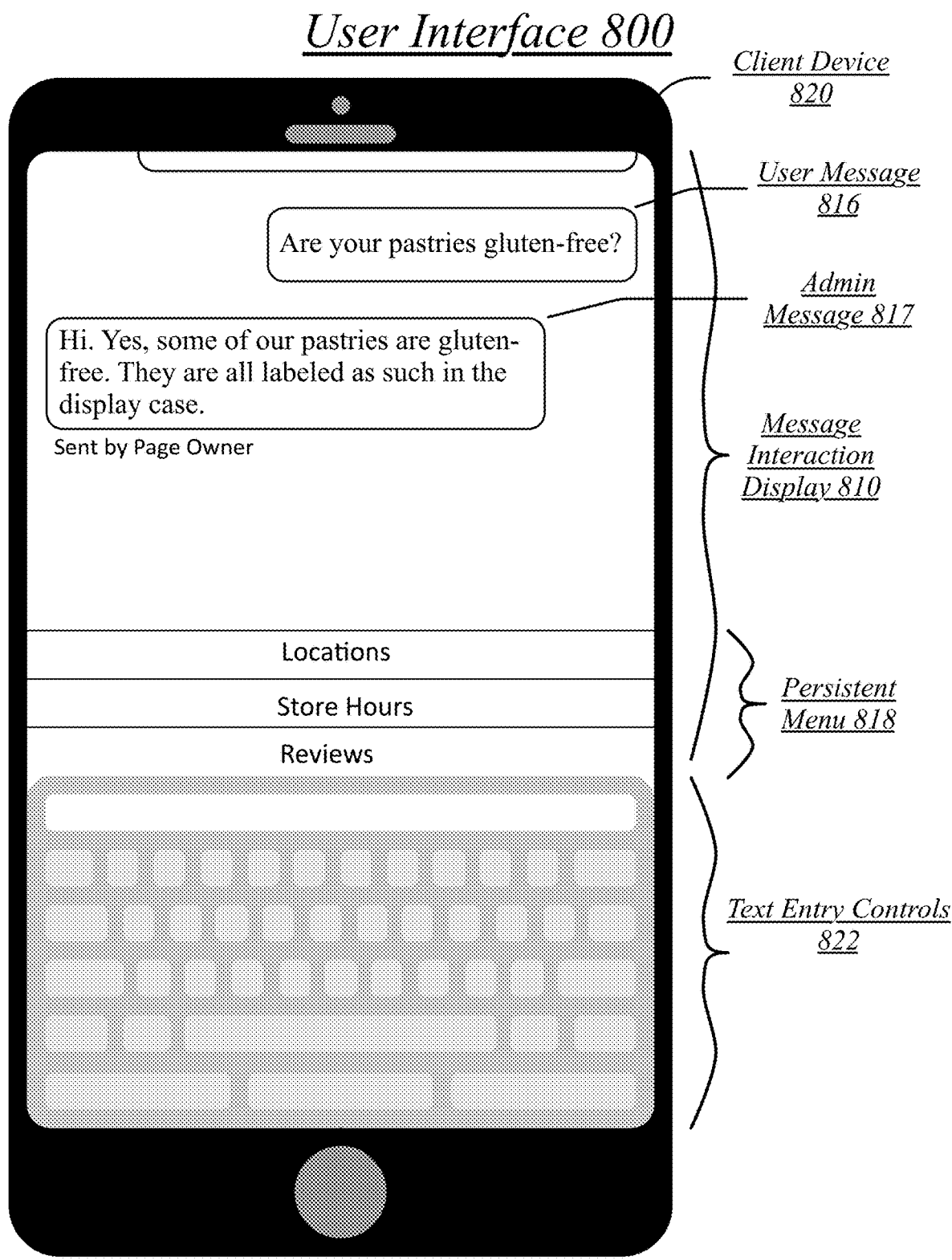
FIG. 8 illustrates a second user interface for a user client interacting with a page bot

FIG. 8 illustrates a user interface 800 for a user client interacting with a page bot. The UI 800 may be presented on a client device 820, which may the same as or analogous to the client device 720. Similarly, the UI 800 may include a message interaction display 810 and text entry controls 822 which may be analogous to the message interaction display 710 and text entry controls 722.

As shown in FIG. 8, a user has sent a user message 816 that the page bot cannot answer. The intent of the user message may not be enabled by the response assistant, or the web page may not have the relevant information to enable a response to the message. In that case, the message may be escalated to the administrator, who may provide an admin message 817 in response. In some embodiments, whenever the administrator responds a user message, an indication that the admin message is sent from a human operator rather than a bot, is provided, e.g. the text "sent by page owner". In other embodiment, no indication may be provided, as it may be assumed that the responses are human generated unless otherwise noted.

The UI 800 also shows the use of a persistent menu 818. The persistent menu 818 may remain fixed in a portion of the message interaction display 810 and may present one or more menu options corresponding to intents and/or page fields. The persistent menu options, when selected, present information about the selected intent/page field. The information may be presented within the message interaction display 810, in an overlay window, in a separate application, in an embedded web browser view, as a message within the message interaction display 810, or in any other suitable format.

Figure 9A:
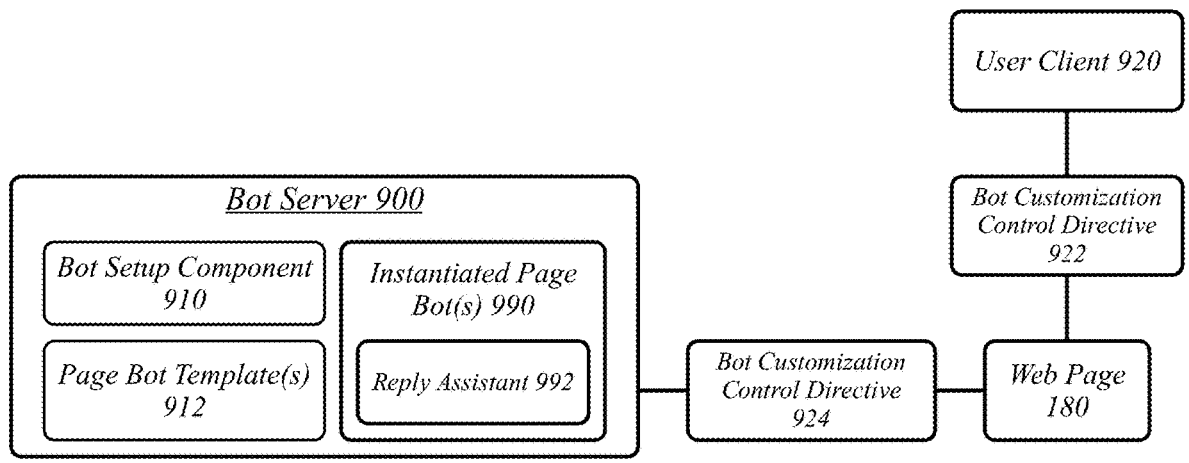
FIG. 9A illustrates an embodiment of a page bot creation being performed by a user request communication system.

FIG. 9A illustrates an embodiment of a page bot customization being performed by a user request communication system 100.

In FIG. 9A, it is assumed that a page bot has already been created for the web page 180. The creation of a page bot may be performed by a bot server 900. The bot server 900 may be communicatively coupled to one or more web pages 180. In some embodiments, the bot server 900 and the one or more servers that host the web pages 180 may be owned or controlled by the same entity, for example, a social networking service. In other embodiments, the bot server 900 and the one or more servers that host the web pages 180 may be owned or controlled by different entities.

In an embodiment, a bot setup component 910 may have created a page bot for the web page 180 from a page bot template 912. A page bot template 912 may include software instructions that allow an instantiated page bot 990 to receive messages directed to a web page, understand the message, retrieve information from the web page or response assistant 992 settings relevant to the meaning of the message, and to respond to the message. When instantiated, the instance of the page bot may complete the page bot template 312 by completing various fields and/or assigning values to variables, such as with an association to the web page 180 that requested its creation. For example, the bot server 300 may receive a unique bot identifier and a messaging bot identifier used for messaging, which the bot creation component may use to fill in a page bot template. Additionally, instantiating the page bot may include authorizing the page bot to access the contents of the web page, for example, with an authorization token. Once the page bot template is created, no further developer time may be needed, and any number of web page administrators may associate a page bot with their web pages without needing programming experience themselves.

The instantiated page bot may be enabled to respond to messages directed to the web page. For example, the page bot identifier and/or the messaging bot identifier may be associated with a messaging identifier and/or Page ID of the web page 180. When a messaging conversation is begun with the web page, the messaging bot identifier may be associated with the thread ID of the conversation thread. Once a page bot is instantiated, it may be stored with other instantiated page bots 990 on the bot server 900 or on a separate server or storage device in communication with the bot server 900. Once instantiated, a page bot 990 may be ready and able to receive messages sent to its associated web page 180, determine the meaning of the message, and generate a message response from information accessed from the associated web page 180.

An instantiated page bot 990 may be customized via one or more bot customization control directives 922, 924. A bot customization control directive 922 may include, for example, administrator action performed on the user client 920 that enables the response assistant 992 to respond to messages, selections to enable or disable intents for responses, selections to customize a response to an intent, selections to setup a page field, and other selections of setting UI elements. The bot customization control directives 924 may be the same as the bot customization control directives 922, or may include other or additional information, such as an identifier of the web page 180 that is associated with the customization control directives.

Figure 9B:
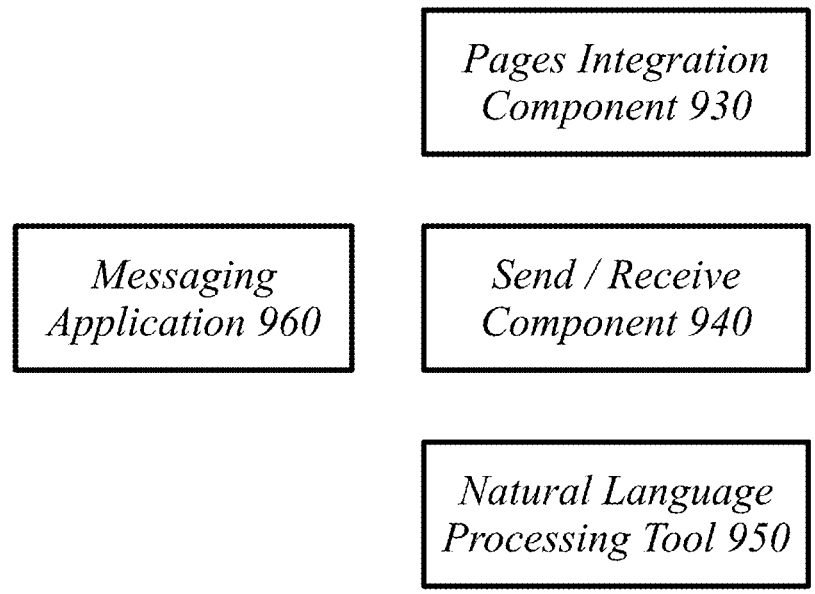
FIG. 9B illustrates an embodiment of component used to operate the user request communication system.

FIG. 9B illustrates an embodiment of components used in the user request communication system 100. The components may include a pages integration component 930, a send/receive component 940, and a natural language processing tool 950.

The pages integration component 930 may provide the UI that page owners use to: enable the response assistant, save which intents are enabled, and save specific answers to those intents. The send/receive component 940 may include a server that receives messages from users and maps intents from the natural language processing tool 950 into answers to respond with. Such messages may be received from a messaging application 960 being used by each user. The natural language processing tool 950 may include a natural language processing component, as will be discussed with respect to FIG. 10, that determines the intent of user messages.

Figure 10:
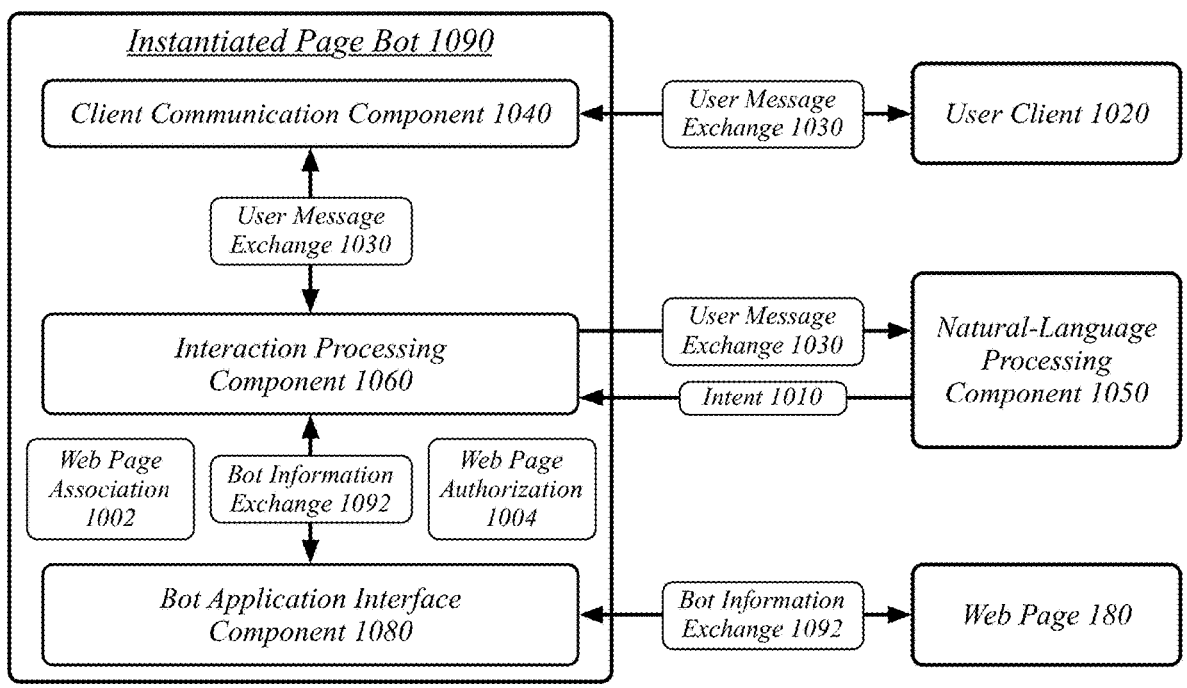
FIG. 10 illustrates an embodiment of a user-to-bot conversation being performed by a user request communication system.

FIG. 10 illustrates an embodiment of a user-to-bot conversation being performed by a user request communication system 100.

The user-to-bot conversation may be conducted by an instantiated page bot 1090. The instantiated page bot 1090 may be coupled to messaging servers 110 for a messaging system. The messaging servers 110 may perform the sending and receiving of messages between the instantiated page bot 1090 and the user client 1020. The messaging servers 110 may perform the sending and receiving of information between the instantiated page bot 1090 and the web page 180, or a bot application front-end may be used.

A user client 1020 may comprise a messaging client, a dedicated client for access to the instantiated page bot 1090 or any other client including messaging functionality. The user client 1020 may execute on the client device. The user client 1020 may engage in a user message exchange 1030 with a web page 180 via the instantiated page bot 1090 using a client communication component 1040. The client communication component 1040 may provide a client front-end to the instantiated page bot 1090, which may be mediated by the transmission of messages by a messaging system. The user message exchange 1030 may comprise the sending of user-composed messages from the user client 1020 to the instantiated page bot 1090 and the sending of message responses from the instantiated page bot 1090 to the user client 1020.

A web page association 1002 may be stored with the instantiated page bot. The web page association 1002 may be used, for example, when communicating with a natural language processing (NLP) component 1050 to identify the web page that the instance of the page bot is associated with. The NLP component 1050 may be a component of the natural language processing tool 950.

An interaction processing component 1060 may interface with the NLP component 1050 to obtain an intent 1010 of a message in the user message exchange 1030. The interaction processing component 1060 may use the intent 1010 to generate bot responses, including message responses and bot actions. The interaction processing component 1060 may act as an intermediary between the client communication component 1040 and the bot application interface component 1080. A bot action may include performing a software task other than retrieving data from a page field. A bot action may include, for example, interacting with a retail application, or invoking another application.

The NLP component 1050 may be implemented using known natural language processing techniques. For example, the interaction processing component 1060 of the instantiated page bot 1090 may forward or otherwise make the received message accessible to the NLP component 1050 with a request for an intent. The NLP component 1050 may use a basic page bot NLP model to parse the message and identify one or more intents that may be indicated by the message. The basic page bot NLP model may be used for all instantiated page bots 990. A basic page bot NLP model may, for example, include rules that associate various user-provided words with a meaning that may map to a page field. Words associated with times or dates, for example, may all map to a meaning of "hours of operation." In some embodiments, the intent 1010 may directly indicate which page field a response should come from.

Other bot NLP models may define the behavior of bots using stories. Stories are example conversations. On top of user messages and bot messages, the stories may also contain bot actions that carry out a service provided by a bot. The stories may also be annotated with examples of the information that a bot should be extracting from user messages, thereby teaching the bots what to learn and how. A bot may be configured from annotated example conversations between a hypothetical user and the messaging bot that illustrate how an interaction could proceed. A developer may write a plurality of example conversations, where each conversation represents a scenario for the messaging bot. A developer submits an example-interaction repository to a natural-language machine learning component and receives a sequence model from the natural-language machine learning component in response. A bot server may then perform a user-to-bot conversation based on the sequence model. In an embodiment, the NLP component 1050 may include other bot NLP models. For example, third party network accessible services associated with the entity represented by a web page may provide an NLP model to allow access to their services. For example, when the entity is a retail business, the entity may have an association with a third-party online storefront service to enable online ordering of products. The NLP model for the online storefront service may enable the page bot of the web page to communicate with the online storefront service so that the user may, for example, browse products, request or search for product information, or place orders. In some embodiments, a plurality of NLP components may be available, each with a different bot NLP model.

The instantiated page bot 1090 may engage in a bot information exchange 1092 with the web page 180 via a bot application interface component 1080. The bot application interface component 1080 may act as a front-end to the bot server 900 and/or messaging system for bot applications. The bot information exchange 1092 may comprise accessing the contents of the web page 180 and retrieval of data from the web page 180. The interaction processing component 1060 may use the intent 1010 to determine which page field to access and/or which response assistant 992 response to use. The bot application interface component 1080 may use the web page authorization 1004 to access the contents in the identified page field of the web page 180. The web page authorization 1004 may include, for example, an access token, a password, or any other authorization mechanism that allows the page bot 1090 to access and retrieve data from the web page 180.

The interaction processing component 1060 may compose a message response including some or all of the data retrieved from the identified field or response assistant response. The message response may be transmitted to the user client 1020 as a part of the user message exchange 1030.

In an embodiment, after an initial message from a user client, the interaction processing component 1060 may generate a menu from a set of fields on the web page and may present the menu to the user client. The menu may, for example, list what kinds of information may be requested. The interaction processing component may receive a selection of a menu item from the user client, which may be instead of receiving a natural language user message. The interaction processing component 1060 may then proceed as discussed, retrieving data from a field associated with the selection; composing a message response including the retrieved data; and sending the message response to the client device.

Figure 11:
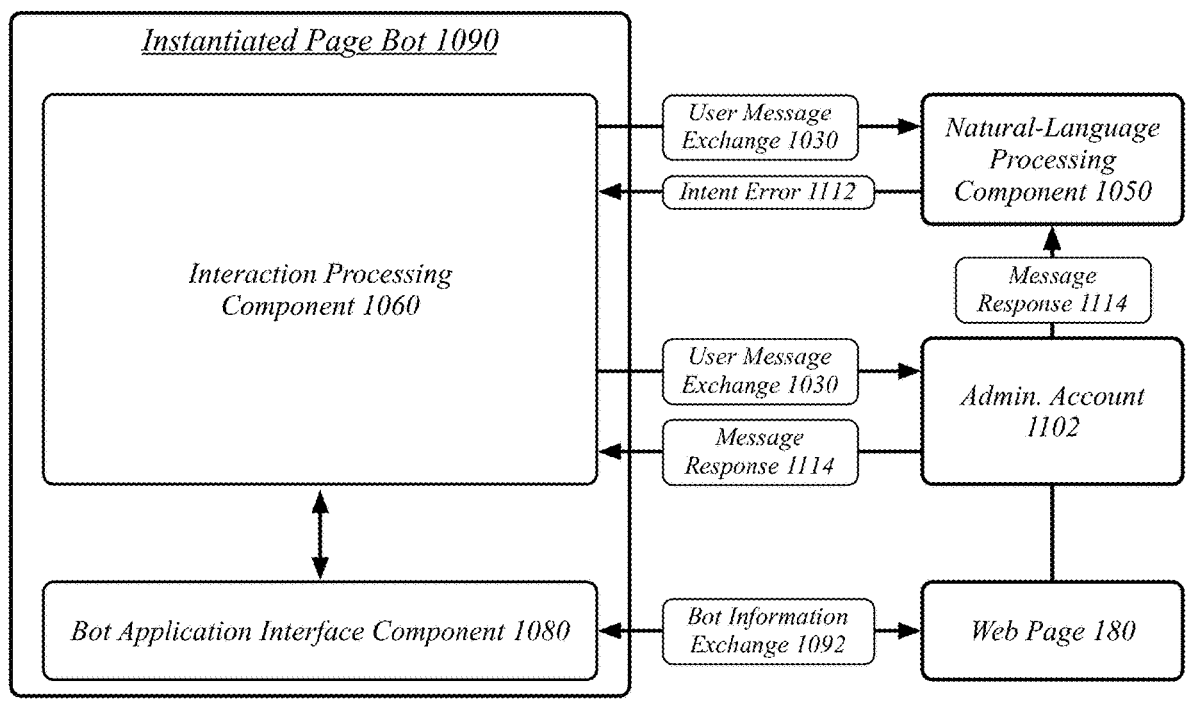
FIG. 11 illustrates an embodiment of a user-to-bot conversation being performed by a user request communication system.

FIG. 11 illustrates an embodiment of a user-to-bot conversation being performed by a user request communication system 100. In particular, the user-to-bot conversation depicted in FIG. 11 may take place when the system shown in FIG. 10 receives a user message for which an intent cannot be determined.

As shown in FIG. 11, the interaction processing component 1060 may have forwarded or otherwise made the received message from the user message exchange 1030 accessible to the NLP component 1050 with a request for an intent. The NLP component 1050 may not be able to determine an intent for the message. The basic page bot NLP model may not have any rules or logic to understand the words in the message. This may occur, for example, if the message includes a request for information that is not available on the web page, e.g. "who works there?" or "are you wheelchair accessible?". In some cases, an intent may be determined but with a confidence rating that is below some threshold. When an intent cannot be determined at all or with sufficient confidence, the NLP component 1050 may return an intent error 1112. The meaning error 1112 may comprise a code, a keyword, a null value, or any other means of indicating that no intent was determined.

When the interaction processing component 1060 receives the intent error 1112, the message from the user message exchange 1030 may be escalated to the administrator of the web page 180. For example, the message may be sent to an administrator account 1102. The administrator account 1102 may be an account in a messaging system used by the user request communication system 100. The administrator account 1102 may be a messaging account associated with a host server of the web page 180, or an email account. The embodiments are not limited to these examples.

The administrator may be able to read the message that caused the intent error and may compose a message response 1114. The message response 1114 may be returned to the page bot 1090 for transmittal to the user client 1020, or may be sent directly from the admin account 1102. The message response 1114 may also be provided to the NLP component 1050. The NLP component 1050 may use the message and the message response 1114 to update the model used to determine the intent of a message. In an embodiment, the escalation of a message to an administrator may include "baton passing", where the transition from page bot to administrator appears seamless to the user. That is, the administrator message response appears in the same conversation as the earlier messages to and from the page bot, and, to the user, it appears as though they are still communicating with the same entity. Baton passing provides the ability to switch out the operator while maintaining the conversation with the same page bot. In an embodiment, the message history of a conversation is saved so that the new operator has access to the conversation context. Baton passing is described further in U.S. Provisional Patent Application No. 62/486,115, entitled "Bots for Groups, Music, and Message Threads" filed on Apr. 17, 2017, which is incorporated herein by reference in its entirety.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
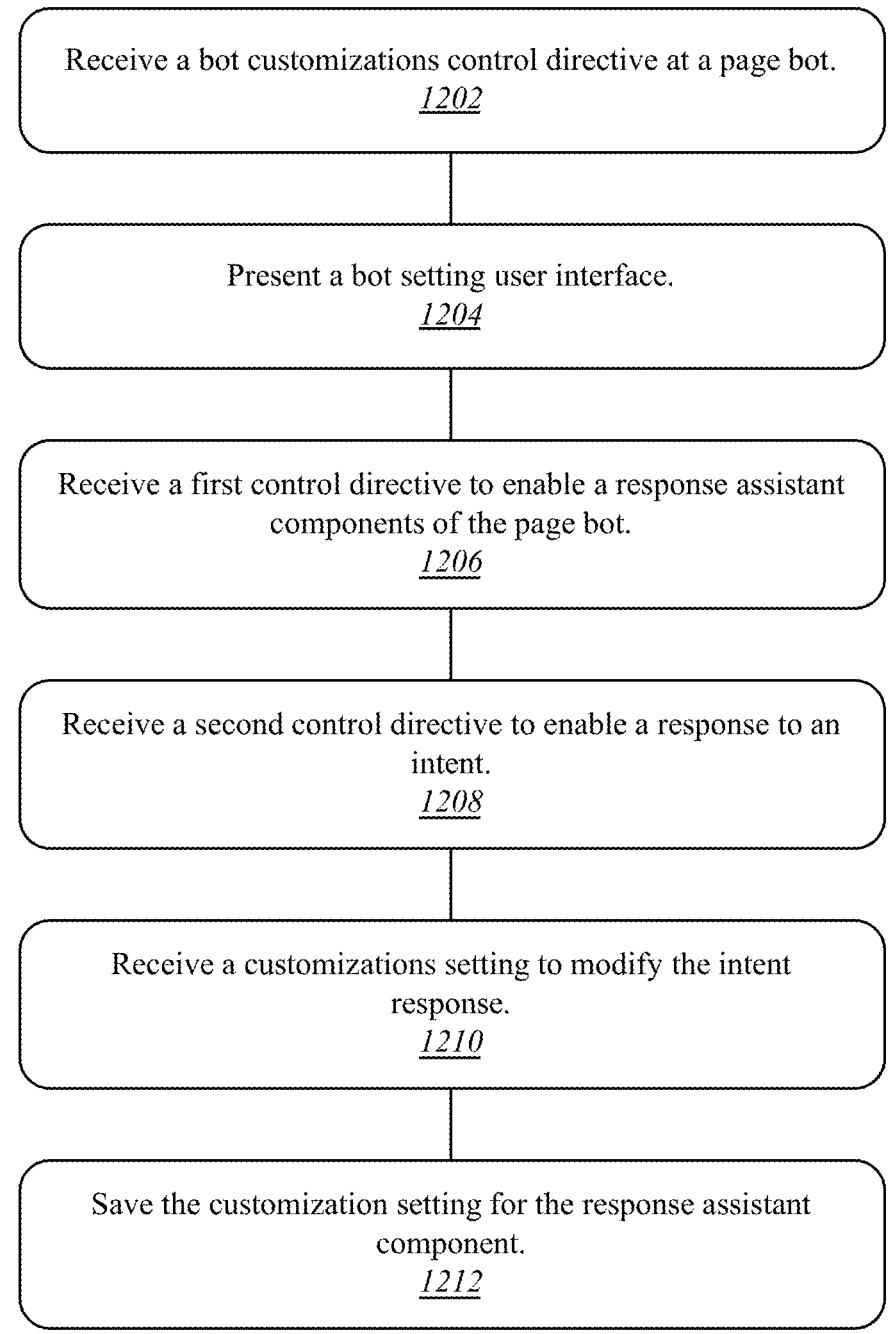
FIG. 12 illustrates an embodiment of a logic flow for the system of FIG. 1.

FIG. 12 illustrates one embodiment of a logic flow 1200. The logic flow 1200 may be representative of some or all of the operations executed by one or more embodiments described herein.

In the illustrated embodiment shown in FIG. 12, the logic flow 1200 may receive a bot customization control directive at a page bot associated with a web page at block 1202. For example, the bot setup component 910 may receive a bot customization control directive 924. The bot customization control directive 924 may be sent, for example, when an administrator opens a settings window for messages in the web page.

The logic flow 1200 may present a bot setting user interface in response to the control directive at block 1204. For example, the bot setup component 910 may present the user interface 300 to the user client 920 in response to the bot customization control directive 924.

The logic flow 1200 may receive a first control directive in the bot setting user interface to enable a response assistant component of the page bot at block 1206. For example, the bot setup component 910, may receive a selection of the toggle 306 and/or element 308.

The logic flow 1200 may receive a second control directive in the bot setting user interface to enable a response to an intent at block 1208. For example, the bot setup component 910 may receive a selection of a toggle 406 or 414.

The logic flow 1200 may receive a customization setting in the bot setting user interface to modify the enabled response to the intent at block 1210. For example, the bot setup component 910 may receive a selection of a customization element 408 for an intent and may present a customization pane 510. The administrator may modify the response associated with the intent and select a save UI element.

The logic flow 1200 may save the customization setting for the response assistant component at block 1212. The saved customization setting may include an identification that responses to the intent are enabled, and the modified response.

The embodiments are not limited to this example.

Figure 13:
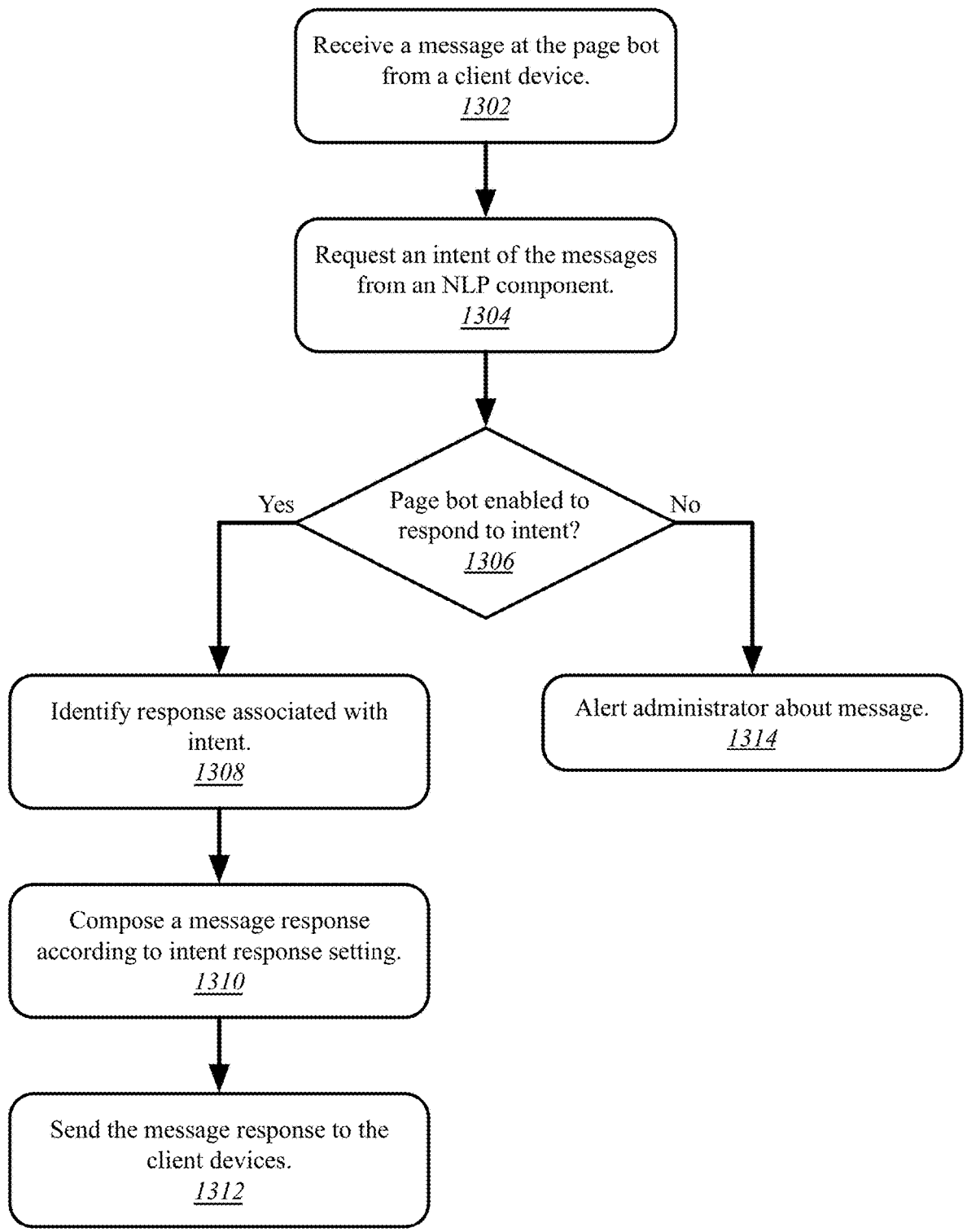
FIG. 13 illustrates an embodiment of a second logic flow for the system of FIG. 1.

FIG. 13 illustrates one embodiment of a logic flow 1300. The logic flow 1300 may be representative of some or all of the operations executed by one or more embodiments described herein.

In the illustrated embodiment shown in FIG. 13, the logic flow 1300 may receive a message at the page bot from a client device at block 1302. For example, a page bot 1090 may receive a message as part of a user message exchange 1030 from a user client 1020.

The logic flow 1300 may request an intent of the message from a natural language processing component at block 1304. For example, the interaction processing component 1060 of the instantiated page bot 1090 may forward or otherwise make the received message accessible to the NLP component 1050 with a request for an intent. The NLP component 1050 may then return a intent 1010 to the interaction processing component 1060.

The logic flow 1300 may determine whether the page bot is enabled to respond to the identified intent at block 1306. For example, the page bot may check the settings for its response assistant 992 to determine whether a response to the intent is enabled.

The logic flow 1300 may identify a response associated with the intent at block 1308, when the page bot is enabled to respond to the intent. For example, when a response assistant 992 setting for a page bot is enabled to respond to the identified intent, the response associated with the intent may be identified and retrieved from the settings. In some embodiments, the response may be retrieved from a page field associated with the identified intent.

The logic flow 1300 may compose a message response according to the intent response setting at block 1310. For example, the interaction processing component 1060 may retrieve text from a page field and may generate a message response comprising the text. The interaction processing component 1060 may retrieve images from a page field and may generate a message response comprising a carousel that presents the images in way that allows the user to scroll through a plurality of images in a direction perpendicular to the directionality of the message display. The interaction processing component 1060 may retrieve a link to a web page or to data provided from another web site or application, and may generate a message response comprising the retrieved information as a mini-web view within the messaging application interface. The interaction processing component 1060 may include one or more calls to action elements in the message response. The message response may also include an indicator that the message response comes from a page bot and not from a human operator.

The logic flow 1300 may send the message response to the client device at block 1312.

When the page bot is not enabled to respond to the intent, the logic flow 1300 may alert the page administrator about the message at block 1314. For example, the response assistant 992 settings for the identified intent may be disabled, or the NLP component may have returned an intent error. The administrator may be alerted, for example, with a new message notification, a visual or audible alert, or other indications that the page bot could not reply to the user message.

Figure 14:
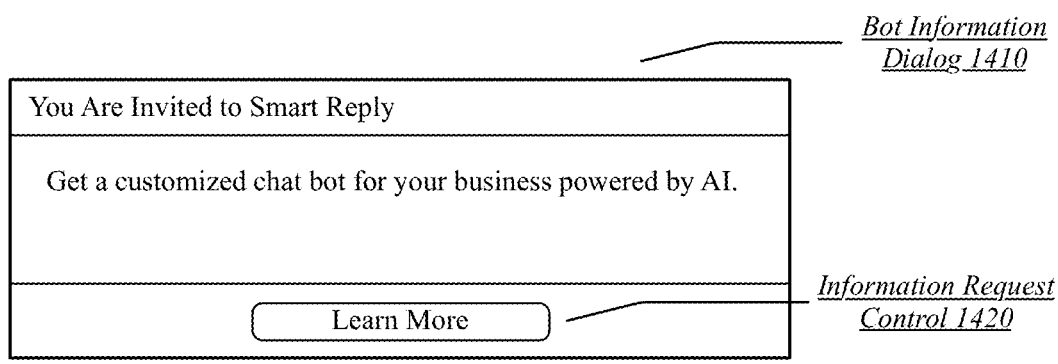
FIG. 14 illustrates a user interface for a page administrator.

FIG. 14 illustrates a user interface 1400 for a page administrator. The UI 1400 may be presented, for example, when the page administrator is viewing a messaging section of the web page 180. The UI 1400 may comprise a bot information dialog 1410, the bot information dialog 1410 comprising information indicating the availability of a response assistant. The bot information dialog 1410 may comprise an information request control 1420, the information request control 1420 presenting an option to the page administrator to learn more about response assistants. The bot information dialog 1410 may present an option to the page administrator to enable a response assistant.

FIG. 15 illustrates a user interface 1500 for a page administrator. The UI 1500 may be presented when the page administrator selects the control to learn more about response assistants, and may present information about the response assistant and a setup response assistant control 1510. The setup response assistant control 1510 empowers a page administrator to setup a response assistant for a page they administer.

FIG. 16 illustrates a user interface 1600 for a page administrator. The UI 1600 may be presented in response to selecting a setup response assistant control 1510. The UI 1600 may present settings options for messaging in general, including elements for enabling the response assistant, such as a smart reply toggle 1606.

FIG. 17 illustrates a messaging user interface 2200 for a page administrator. The UI 1700 may display a messaging conversation between a user and a web page as represented by a page bot. In an embodiment, the UI 1700 may show an administrator how the response assistant would have responded to a user message, if the response assistant is disabled. The UI 1700 may differentiate between threads handled by the response assistant and those that need to be responded to by the administrator.

The UI 1700 may comprise an interaction testing pane 1710. The interaction testing pane 1710 displays a test interaction between a test user and a response assistant, a smart reply bot. The page administrator may enter text in a text entry field 1730 and have the entered text responded to by the smart reply bot in a test user-bot interaction.

The UI 1700 may comprise an information pane 1720. The information pane 1720 may comprise information about the test user being interacted with in the interaction testing pane 1710. Test user information may be configured by the page administrator. Test user information may comprise a local time for the test user, a test place of employment for the test user, a test place of schooling for the test user, a test home location for the test user, a test birthplace for the test user, or any other test user information for the test user. The test user information may be used by the smart reply bot to configure its automated replies, based on configuration of the smart reply bot to respond to user-specific information. The information pane 1720 may comprise labels and notes that may be added to a messaging interaction. Labels and notes may similarly be used by the smart reply bot to configure its automated replies, based on configuration of the smart reply bot to respond to administrator-specific labels and/or notes.

Figure 18A:
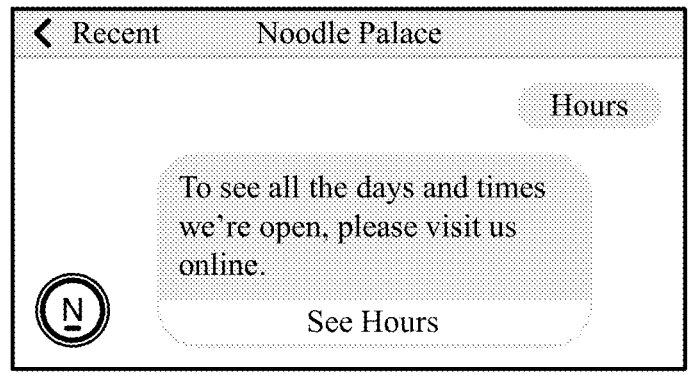
FIGS. 18A-18C illustrate messaging user interfaces.
Figure 18B:
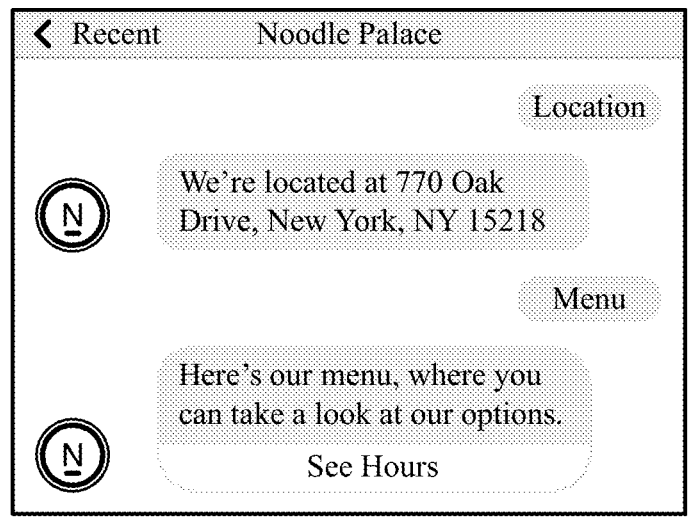
Figure 18C:
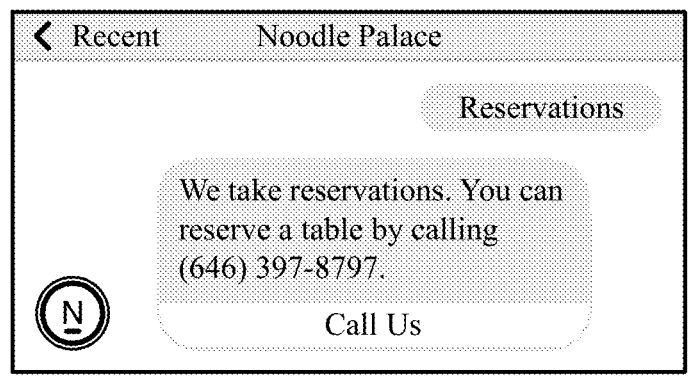

FIGS. 18A-18C illustrate a messaging user interface 1800, showing various examples of user messages and automated responses that may be sent by the response assistant. The automated responses may be configured by an administrator and automatically suggested based on detected intents for the sending user.

A response assistant may receive an hours prompt and respond with a smart reply indicating hours for the business and/or providing a call-to-action button empowering the user to view hours for a business associated with the response assistant.

A response assistant may receive a location prompt and respond with a smart reply indicating a location for the business and/or providing a call-to-action button empowering the user to view a location for the business associated with the response assistant.

A response assistant may receive a menu prompt and respond with a smart reply indicating menu options for the business and/or providing a call-to-action button empowering the user to view a menu for the business associated with the response assistant.

A response assistant may receive a reservations prompt and respond with a smart reply indicating instructing for making a reservation and/or a providing a call-to-action button empowering the user to make a reservation, whether through an online reservation system (e.g., a web-based reservation system, an app-based reservation system) or through contacting the business (e.g., initiating a voice call with the business).

Figure 19A:
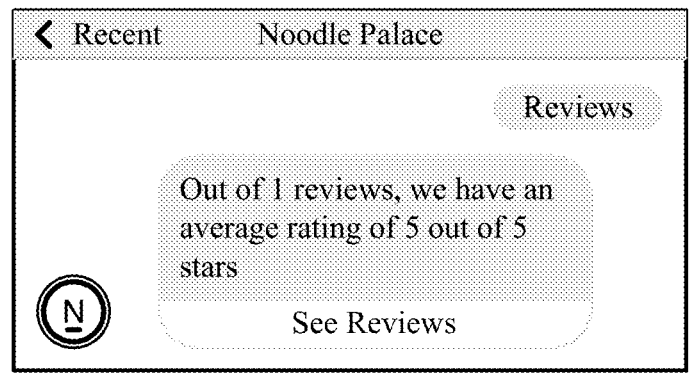
FIGS. 19A-19B illustrate messaging user interfaces.
Figure 19B:
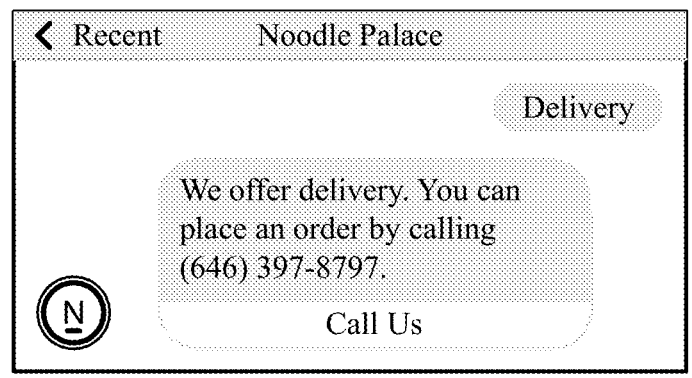

FIGS. 19A-19B illustrate a messaging user interface 1900, showing various additional examples of user messages and automated responses that may be sent by the response assistant. The automated responses may be configured by an administrator and automatically suggested based on detected intents for the sending user.

A response assistant may receive a reviews prompt and respond with a smart reply indicating reviews or a review summary for the business and/or providing a call-to-action button empowering the user to view reviews for the business associated with the response assistant.

A response assistant may receive a delivery prompt and respond with a smart reply indicating delivery information for the business and/or a call-to-action button empowering the user to configure a delivery order with the business associated with the response assistance, such as by initiating a voice call with the business.

Figure 20:
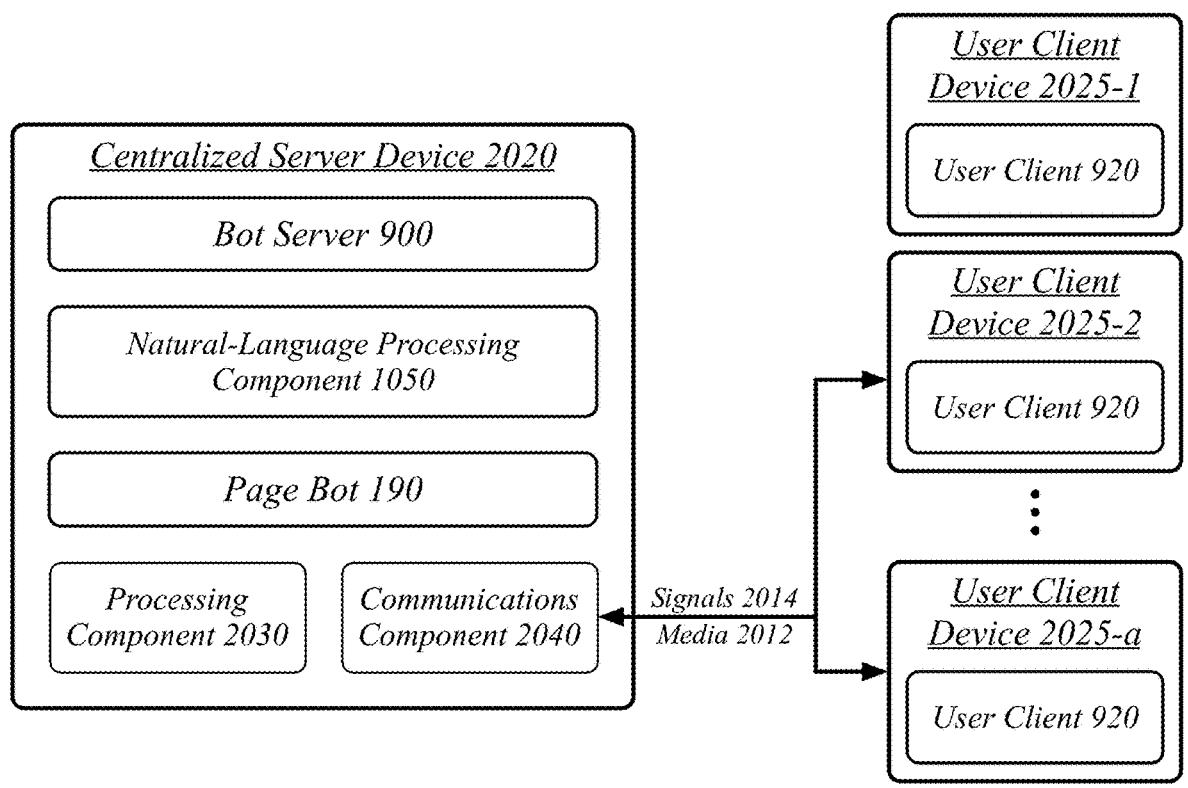
FIG. 20 illustrates an embodiment of a centralized system for the system of FIG. 1.

FIG. 20 illustrates a block diagram of a centralized system 2000. The centralized system 2000 may implement some or all of the structure and/or operations for the user request communication system 100 in a single computing entity, such as entirely within a single centralized server device 2020.

The centralized server device 2020 may comprise any electronic device capable of receiving, processing, and sending information for the user request communication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 2020 may execute processing operations or logic for the user request communication system 100 using a processing component 2030. The processing component 2030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 2020 may execute communications operations or logic for the user request communication system 100 using communications component 2040. The communications component 2040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 2040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 2012 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 2020 may communicate with other devices over a communications media 2012 using communications signals 2014 via the communications component 2040. The devices may be internal or external to the centralized server device 2020 as desired for a given implementation. The centralized server device 2020 may implement the bot server 900, natural-language processing component 440, and page bot 190. This may comprise an embodiment in which the page bot 190 is executed by a messaging system. In some embodiments, a centralized server device 2020 may be used with a page bot 190 executed by the bot provider. The centralized server device 2020 may communicate with a plurality of user client devices 2025, each executing a user client 920.

Figure 21:
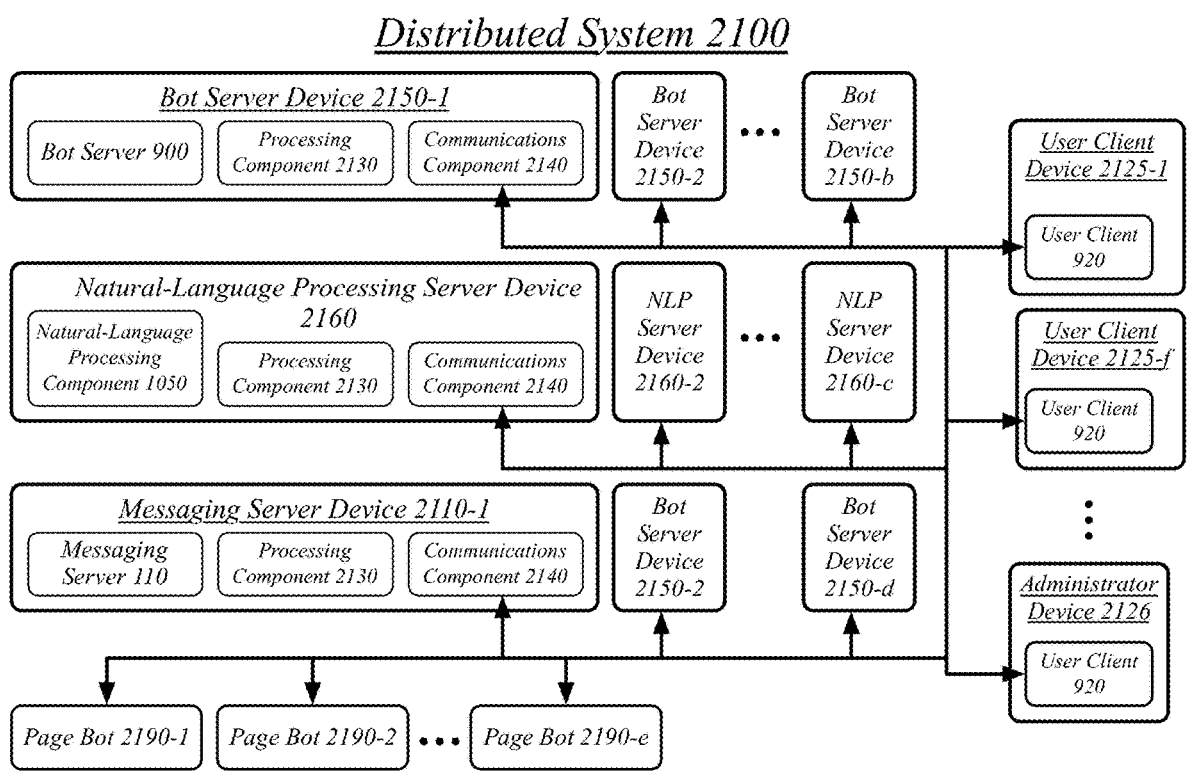
FIG. 21 illustrates an embodiment of a distributed system for the system of FIG. 1.

FIG. 21 illustrates a block diagram of a distributed system 2100. The distributed system 2100 may distribute portions of the structure and/or operations for the user request communication system 100 across multiple computing entities. Examples of distributed system 2100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 2100 may comprise a plurality of messaging server devices 2110, bot server devices 2150, and natural-language processing server devices 2160. In general, the server devices 2110, 2150, and 2160 may be the same or similar to the centralized server device 1420 as described with reference to FIG. 14. For instance, the server devices 2110, 2150, and 2160 may each comprise a processing component 2130 and a communications component 2140 which are the same or similar to the processing component 1430 and the communications component 1440, respectively, as described with reference to FIG. 14. In another example, the server devices 2110, 2150, and 2160 may communicate over a communications media 1012 using communications signals 1014 via the communications components 2140.

The messaging server devices 2110 may comprise or employ one or more programs that operate to perform various methodologies in accordance with the described embodiments. In one embodiment, for example, the messaging server devices 2110 may implement a plurality of messaging servers 110.

The bot server devices 2150 may comprise or employ one or more programs that operate to perform various methodologies in accordance with the described embodiments. In one embodiment, for example, the bot server devices 2150 may implement a plurality of bot servers 900.

The natural-language processing (NLP) server devices 2160 may comprise or employ one or more programs that operate to perform various methodologies in accordance with the described embodiments. In one embodiment, for example, the NLP server devices 2160 may implement a plurality of NLP components 1050.

The server devices 2110, 2150, and 2160 may communicate with a plurality of page bots 2190. Each of the plurality of page bots 2190 may provide different automated services, though there may also be duplication of automated services such as may provide for competition. The server devices 2110, 2150, and 2160 may communicate with a plurality of user client devices 2125, each executing a user client 920. The server devices 2110, 2150, and 2160 may communicate with a plurality of administrator devices 2126 operated by the administrators of the web pages 180.

Figure 22:
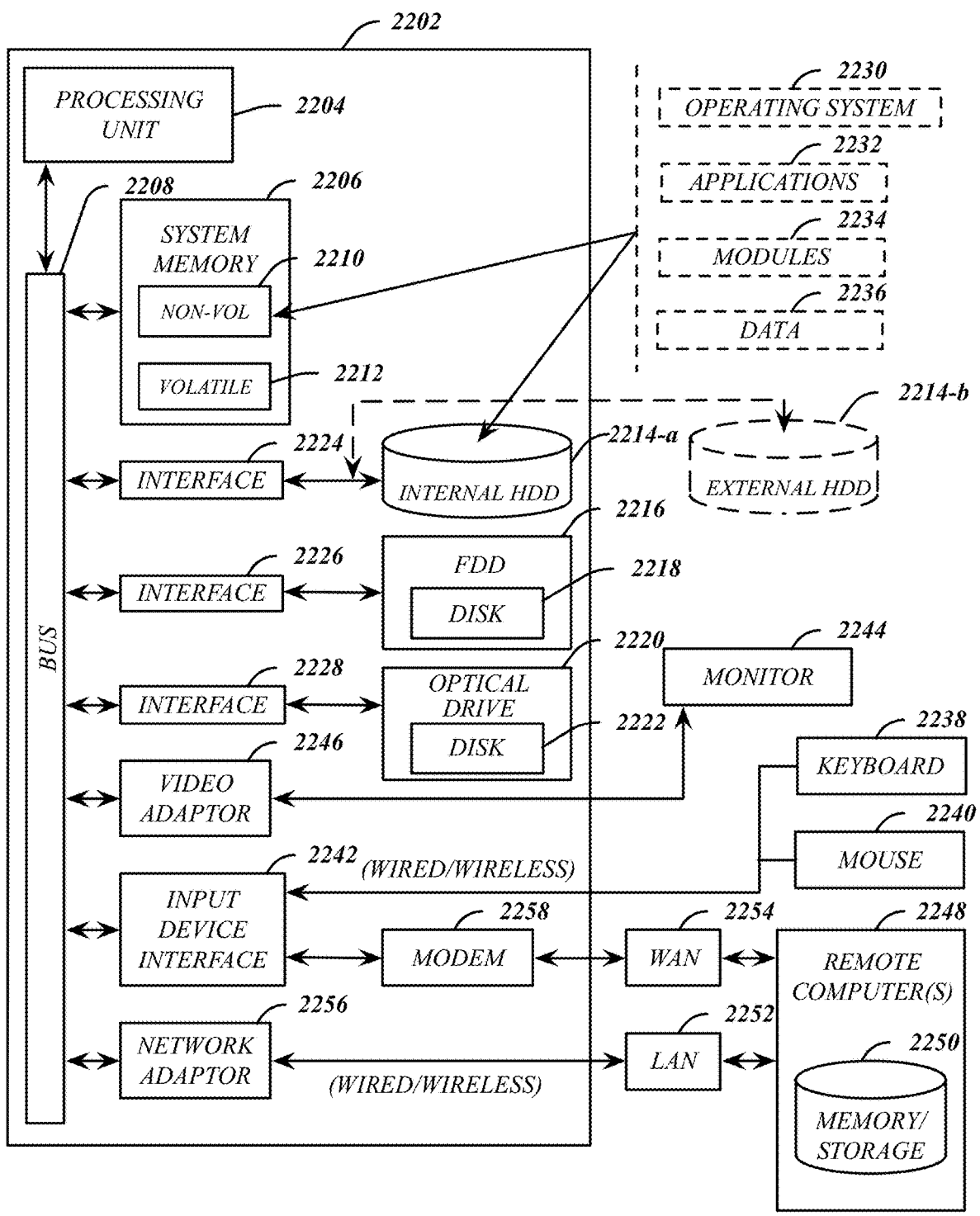
FIG. 22 illustrates an embodiment of a computing architecture.

FIG. 22 illustrates an embodiment of an exemplary computing architecture 2200 suitable for implementing various embodiments as previously described. In one embodiment, the computing architecture 2200 may comprise or be implemented as part of an electronic device. Examples of an electronic device may include those described with reference to FIG. 14, 15, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2200.

As shown in FIG. 22, the computing architecture 2200 comprises a processing unit 2204, a system memory 2206 and a system bus 2208. The processing unit 2204 can be any of various commercially available processors, including without limitation an Athlon®, Duron® and Opteron® processors; embedded and secure processors; DragonBall® and PowerPC® processors; Celeron®, Core (2) Duo®, Itanium®, Pentium®, Xeon®, and XScale® processors; and similar processors. Dual microprocessors, multi-core processors, and other multi-processor architectures may also be employed as the processing unit 2204.

The system bus 2208 provides an interface for system components including, but not limited to, the system memory 2206 to the processing unit 2204. The system bus 2208 can be any of several types of bus structure that may further interconnect to a memory bus (with or without a memory controller), a peripheral bus, and a local bus using any of a variety of commercially available bus architectures. Interface adapters may connect to the system bus 2208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 22, the system memory 2206 can include non-volatile memory 2210 and/or volatile memory 2212. A basic input/output system (BIOS) can be stored in the non-volatile memory 2210.

The computer 2202 may include various types of computer-readable storage media in the form of one or more lower speed memory units, including an internal (or external) hard disk drive (HDD) 2214-*a* (114-*b*), a magnetic floppy disk drive (FDD) 2216 to read from or write to a removable magnetic disk 2218, and an optical disk drive 2220 to read from or write to a removable optical disk 2222 (e.g., a CD-ROM or DVD). The HDD 2214, FDD 2216 and optical disk drive 2220 can be connected to the system bus 2208 by a HDD interface 2224, an FDD interface 2226 and an optical drive interface 2228, respectively. The HDD interface 2224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2210, 2212, including an operating system 2230, one or more application programs 2232, other program modules 2234, and program data 2236. In one embodiment, the one or more application programs 2232, other program modules 2234, and program data 2236 can include, for example, the various applications and/or components of the user request communication system 100.

A user can enter commands and information into the computer 2202 through one or more wire/wireless input devices, for example, a keyboard 2238 and a pointing device, such as a mouse 2240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2204 through an input device interface 2242 that is coupled to the system bus 2208, but can be connected by other interfaces such as a parallel port, IEEE 1394 serial port, a game port, a USB port, an IR interface, and so forth.

A monitor 2244 or other type of display device is also connected to the system bus 2208 via an interface, such as a video adaptor 2246. The monitor 2244 may be internal or external to the computer 2202. In addition to the monitor 2244, a computer typically includes other peripheral output devices, such as speakers, printers, and so forth.

The computer 2202 may operate in a networked environment using logical connections via wire and/or wireless communications to one or more remote computers, such as a remote computer 2248. The remote computer 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wire/wireless connectivity to a local area network (LAN) 2252 and/or larger networks, for example, a wide area network (WAN) 2254. Such LAN and WAN networking environments are commonplace in offices and companies, and facilitate enterprise-wide computer networks, such as intranets, all of which may connect to a global communications network, for example, the Internet.

When used in a LAN networking environment, the computer 2202 is connected to the LAN 2252 through a wire and/or wireless communication network interface or adaptor 2256. The adaptor 2256 can facilitate wire and/or wireless communications to the LAN 2252, which may also include a wireless access point disposed thereon for communicating with the wireless functionality of the adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wire and/or wireless device, connects to the system bus 2208 via the input device interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 23:
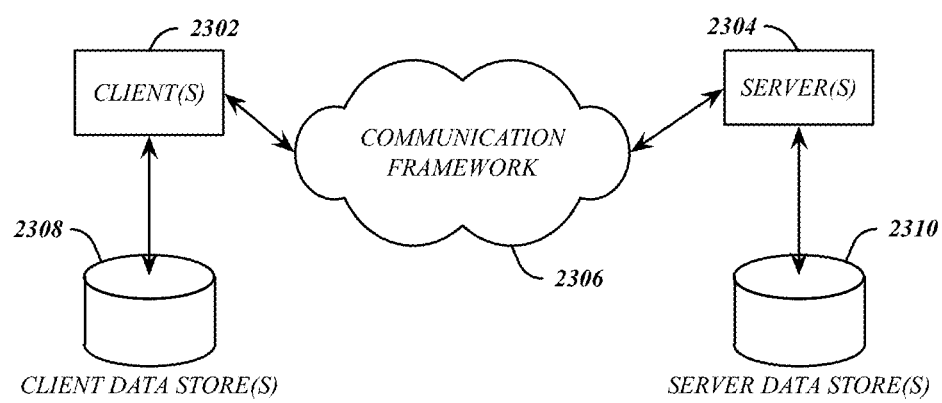
FIG. 23 illustrates an embodiment of a communications architecture.

FIG. 23 illustrates a block diagram of an exemplary communications architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300.

As shown in FIG. 23, the communications architecture 2300 comprises includes one or more clients 2302 and servers 2304. The clients 2302 may implement one or more user client 920, 1020. The servers 2304 may implement one or more bot server 900, one or more natural-language machine learning component 1050, and/or one or more messaging server 110. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information between each other using a communication framework 2306. The communications framework 2306 may implement any well-known communications techniques and protocols. The communications framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1500 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 24:
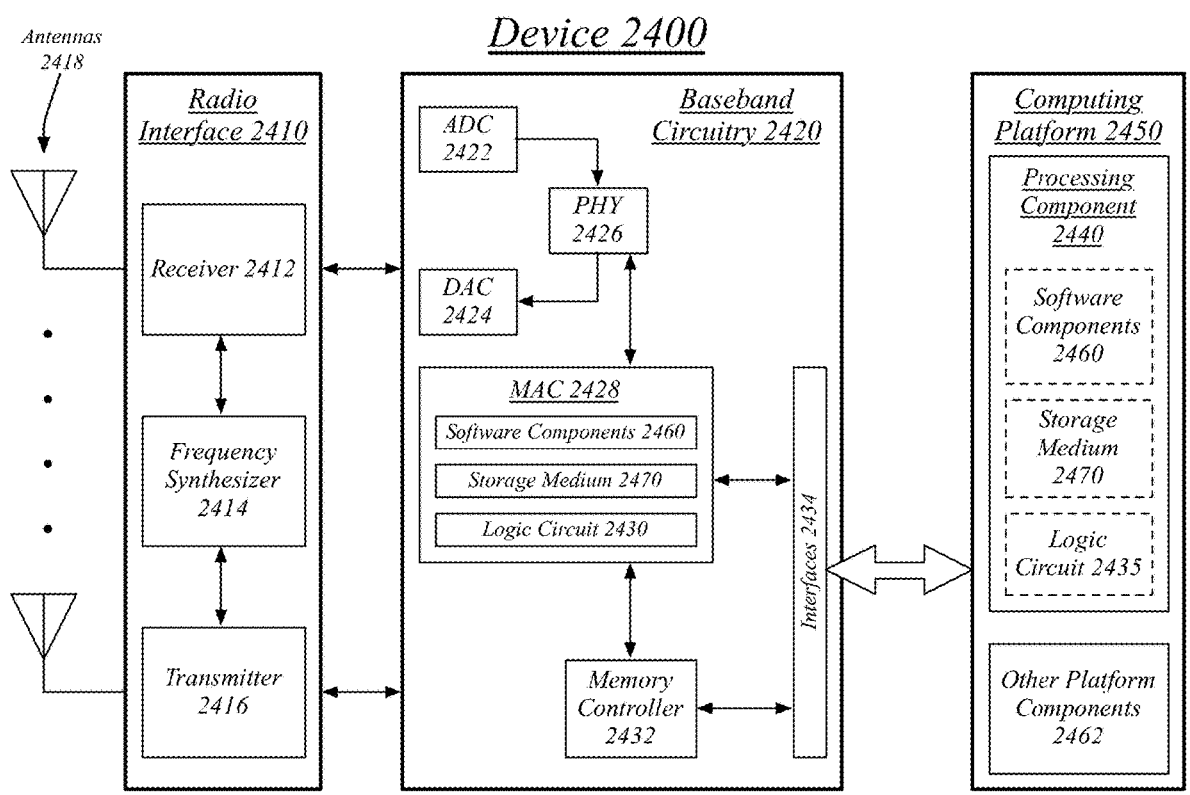
FIG. 24 illustrates an embodiment of a radio device architecture.

FIG. 24 illustrates an embodiment of a device 2400 for use in a multicarrier OFDM system, such as the user request communication system 100. Device 2400 may implement, for example, software components 2460 as described with reference to user request communication system 100 and/or a logic circuit 2435. The logic circuit 2435 may include physical circuits to perform operations described for the user request communication system 100. As shown in FIG. 24, device 2400 may include a radio interface 2410, baseband circuitry 2420, and computing platform 2450, although embodiments are not limited to this configuration.

The device 2400 may implement some or all of the structure and/or operations for the user request communication system 100 and/or logic circuit 2435 in a single computing entity, such as entirely within a single device. Alternatively, the device 2400 may distribute portions of the structure and/or operations for the user request communication system 100 and/or logic circuit 2435 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 2410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 2410 may include, for example, a receiver 2412, a transmitter 2416 and/or a frequency synthesizer 2414. Radio interface 2410 may include bias controls, a crystal oscillator and/or one or more antennas 2418. In another embodiment, radio interface 2410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2420 may communicate with radio interface 2410 to process receive and/or transmit signals and may include, for example, an analog-to-digital converter 2422 for down converting received signals, a digital-to-analog converter 2424 for up converting signals for transmission. Further, baseband circuitry 2420 may include a baseband or physical layer (PHY) processing circuit 2456 for PHY link layer processing of respective receive/transmit signals. Baseband circuitry 2420 may include, for example, a processing circuit 2428 for medium access control (MAC)/data link layer processing. Baseband circuitry 2420 may include a memory controller 2432 for communicating with processing circuit 2428 and/or a computing platform 2450, for example, via one or more interfaces 2434.

In some embodiments, PHY processing circuit 2426 may include a frame construction and/or detection module, in combination with additional circuitry such as a buffer memory, to construct and/or deconstruct communication frames, such as radio frames. Alternatively or in addition, MAC processing circuit 2428 may share processing for certain of these functions or perform these processes independent of PHY processing circuit 2426. In some embodiments, MAC and PHY processing may be integrated into a single circuit.

The computing platform 2450 may provide computing functionality for the device 2400. As shown, the computing platform 2450 may include a processing component 2440. In addition to, or alternatively of, the baseband circuitry 2420, the device 2400 may execute processing operations or logic for the user request communication system 100 and logic circuit 2435 using the processing component 2440. The processing component 2440 (and/or PHY 2426 and/or MAC 2428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 2450 may further include other platform components 2462. Other platform components 2462 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 2400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 2400 described herein, may be included or omitted in various embodiments of device 2400, as suitably desired. In some embodiments, device 2400 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 2400 may be implemented using single input single output (SISO) architectures. However, certain implementations may include multiple antennas (e.g., antennas 2418) for transmission and/or reception using adaptive antenna techniques for beamforming or spatial division multiple access (SDMA) and/or using MIMO communication techniques.

The components and features of device 2400 may be implemented using any combination of discrete circuitry, application specific integrated circuits (ASICs), logic gates and/or single chip architectures. Further, the features of device 2400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2400 shown in the block diagram of FIG. 24 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

The following Table 1 illustrates an example of a number of intents that may be enabled for a restaurant entity's web page response assistant, the type of data of the intent, possible answer formats, and samples of user questions that may map to the intent.

TABLE 1

| Intent | Structured Data/Text based on Structured Data/ Free-Text | Answer Format | Samples of questions |
|---|---|---|---|
| Contact Info | Structured Data | We can be reached at <phone number>. You can also visit us online. [CTA Buttons] Call Us Visit Website | What is your phone number? What is your email? Do you have a website? |
|  | Structured Data | We can be reached at <phone_number>. [CTA Buttons] Call Us | What is your phone number? What is your email? Do you have a website? |
| Delivery | Text based on Structured Data | We offer delivery. You can place an order by calling <phone_number>. [CTA] Call Us | Do you deliver? hi do you do deliveries? do you deliver food to Raidug? Can you deliver to Essensa building in BGC Are you guys available on foodpanda or hungrynaki for home delivery? Do u home deliver Do you offer delivery to Mountain View? |

TABLE 1-continued

| Intent | Structured Data/Text based on Structured Data/ Free-Text | Answer Format | Samples of questions |
|---|---|---|---|
| Hours-webview | Structured Data | We're open X days a week. [CTA Button-link to hours in About section of Page] See Hours | hey . . . are u guys open?? Hi are you open tonight? Are you open on the 28th? Until what time are you open today? r u open this saturday? |
| Hours-fallback-simple day/time range | | We're open <day>-<day>, <time>-<time>. | hey . . . are u guys open ?? Hi are you open tonight? Are you open on the 28th? Until what time are you open today? r u open this saturday? |
| Hours-fallback-complex day/time range | | We're open <day>-<day>, <time>-<time>, and <day>-<day>, <time>-<time>. | hey . . . are u guys open?? Hi are you open tonight? Are you open on the 28th? Until what time are you open today? r u open this saturday? |
| Hours-always open | | We're open 24 hours a day, 7 days a week. | hey . . . are u guys open?? Hi are you open tonight? Are you open on the 28th? Until what time are you open today? r u open this saturday? |
| Location | | We're located at <address> in <city>. [Image-map] | What's your address? Will u plz text me the adress I want to come on Saturday hi. the store at china street shut down . have you moved location? where can we buy cupcakes now Do you have an address where we can come buy and purchase from you Where are you located? |
| Menu | Structured Data | Here's our menu, where you can take a look at our options. [CTA Button-link to pdf, jpg, or URL in webview] See Menu | Could you send me your menu? What's on your menu? Do you have any vegetarian (gluten-free, vegan, etc) options? |
| Reservations | Text based on | We take reservations. You | Do you accept reservations? |

TABLE 1-continued

| Intent | Structured Data/Text based on Structured Data/ Free-Text | Answer Format | Samples of questions |
|---|---|---|---|
|  | Structured Data | can reserve a table by calling <phone_number>. [CTA Button] Call Us | Do I need a reservation? Do you take walk-ins? |
| Reviews | Structured Data | Out of <#>reviews, we have an average rating of <#> out of 5 stars. [CTA Button-link to reviews section of FB Page] See Reviews | reviews? how are your reviews? |
| Thanks | Free-Text |  | Thanks so much! [emojis] Thank you for the info! Ok Great Thanks! Thanks so much for the prompt response WONDERFUL! Thank you so much, I look forward to it. |

The following Table 2 illustrates an example of a number of intents that may be enabled for a restaurant entity's web page response assistant, sample responses, and sample user messages that may map to the intent.

TABLE 2

| Intent to Automate | Sample Auto-response | Sample user messages: |
|---|---|---|
| Hours | We're open M-F 10 AM-5 PM, Sa 9 AM-3 PM, and closed on Sundays. We'll be open for President's Day! (merchants can customize to include upcoming holidays) Good question! Here are our hours: Breakfast 7 AM-10 AM M-Su, Lunch 11 AM-3 PM, M-F, Dinner 5 PM-10 PM,Tu-Sa, Brunch Sa-Su 10 AM-3 PM. We're open 5 pm-2 am Tuesday through Saturday. Kitchen closes at 10 PM daily. {CTA to Make a Reservation} Fake Restaurant is open 24 hrs, 365 days a year! | hey . . . are u guys open ?? Hi are you open tonight? Are you open on the 28th? Until what time are you open today? r u open this saturday? |
| Location | We're located at + {location/directions bubble} Our flagship location is at 1234 Fake Ave in Mountain View, but we have over 10 locations around the Bay Area. {CTA w/ 'View Locations'} Fake Restaurant is located at 1234 Fake Ave in Mountain View between 21st and Liberty Streets. | What's your address? Will u plz text me the address I want to come on Saturday hi. the store at china street shut down . have you moved location? where can we buy cupcakes now Do you have an address where we can come buy and purchase from you Where are you located? |
| Offer Delivery | Hey there. Our address is 1234 Fake Ave, MyTown, NY 11213. Hi there! You can find us at 1234 Fake Street, Faketown, PA, 19127. Hi! 1234 Fake Street, Faketown, PA, 19127. We offer delivery M-F 11 AM-10 PM within 10 miles of our Fake St. location. We offer delivery for orders above $15. We offer takeout, dine-in, and delivery options to suit any schedule! You can place an order online through Seamless.com. {CTA w/ 'Order Now' links to order page} We delivery. Delivery is free within 5 miles of our location. Give us a call if you'd like to set up a delivery order All delivery orders require 24-hour notice and a $200 order minimum. | Do you deliver? hi do you do deliveries? do you deliver food to Raidug? Can you deliver to Essensa building in BGC Are you guys available on foodpanda or hungrynaki for home delivery? Do u home deliver Do you offer delivery to Mountain View? |
| Thanks | Cheers! You're welcome! Anytime! Happy to help. No problem! Let us know if there's anything else we can do for you. | Thanks so much! [emojis] Thank you for the info! Ok Great Thanks! Thanks so much for the prompt response WONDERFUL! Thank you so much :) I'm looking forward to it |
| Menu | Here's a link to our menu {CTA 'View Menu'} | Could you send me your menu? What's on your menu? Do you have any vegetarian (gluten-free, vegan, etc) options? |
| Cuisine | Knickknacks decorate the colorful walls of this venue known for inventive Mexican small plates. Bright, casual joint offering both familiar & innovative halal spins on Indian & Pakistani cooking. We serve delicious Chinese food. | What kind of food do you serve? Is your restaurant halal? What type of food do you have? |
| Contact Info | You can reach us at 123-456-7890 or thisisanemail@email.com during business hours or visit our website anytime! {CTA link to website } | What is your phone number? What is your email? Do you have a website? |
| Reservations | You can make reservations for up to 12 people online. For 13+ people, please call us directly at 555-444-7777. Walk-ins welcome. Our restaurant is first-come, first-serve. We do not accept reservations. Please call ahead for wait times! | Do you accept reservations? Do I need a reservation? Do you take walk-ins? |

TABLE 2-continued

| Intent to Automate | Sample Auto-response | Sample user messages: |
|---|---|---|
| Reviews | Tacolicious has a 4.5 star rating from 1,206 reviews. | reviews? how are your reviews? |

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a bot customization control directive at a page bot associated with a web page, the web page comprising a plurality of page fields;
presenting a bot setting user interface in response to the control directive;
receiving a first control directive in the bot setting user interface to enable a response assistant component of the page bot;
receiving a second control directive in the bot setting user interface to enable a response to a first intent, the response to include a variable field to be populated with data from a first page field of the plurality of the page fields of the web page;
receiving a customization setting in the bot setting user interface to modify the enabled response to the first intent; and
saving the customization setting for the response assistant component.

2. The method of claim 1, comprising;
receiving a message at the page bot from a client device;
requesting an intent of the message from a natural language processing (NLP) component;
determining whether the response assistant component is enabled to respond to the intent;
receiving the data from the first page field of the web page;
composing a message response based at least in part on populating the variable field with the received data from the first page field of the web page; and
sending the message response to the client device.

3. The method of claim 2, comprising: receiving the message and sending the message response via a messaging system.

4. The method of claim 2, comprising:
receiving, from the NLP component, an intent error indicating that the intent of the message was not determined; and
escalating the message to an administrator account of the web page.

5. The method of claim 4, comprising:
receiving a message response from the administrator account of the web page; and
sending the message response to the user.

6. The method of claim 2, comprising:
receiving, from the NLP component, the first intent as the intent of the message; and
composing the message response to include a text specified as the customization setting.

7. The method of claim 2, comprising:
composing the message response to include an indicator specifying that the message response comes from a page bot and not from a human operator.

8. The method of claim 1, comprising:
identifying that a second page field of the plurality of page fields of the web page contains insufficient data to populate a second variable field of the response to the first intent;
providing a setup control element in for an intent associated with the second page field in the bot setting user interface; receiving a selection of the setup control element;
presenting a user interface to enable entry of data into the second page field; and
saving received data to the second page field.

9. An apparatus, comprising:
a bot setup component operative to receive a bot customization control directive at a page bot associated with a web page, the web page comprising a plurality of page fields; present a bot setting user interface in response to the control directive; receive a first control directive in the bot setting user interface to enable a response assistant component of the page bot; receive a second control directive in the bot setting user interface to enable a response to a first intent, the response to include a variable field to be populated with data from a first page field of the plurality of the page fields of the web page; receive a customization setting in the bot setting user interface to modify the enabled response to the first intent; and save the customization setting for the response assistant component.

10. The apparatus of claim 9, further comprising:
a client communication component operative to receive a message at the page bot from a client device; and send a message response to the client device;
an interaction processing component operative to request an intent of the message from a natural language processing (NLP) component, determine whether the response assistant component is enabled to respond to the intent; receive the data from the first page field of the web page; and compose the message response based at least in part on populating the variable field with the received data from the first page field of the web page including the identified response.

11. The apparatus of claim 10, further comprising:
the interaction processing component operative to receive, from the NLP component, an intent error indicating that the intent of the message was not determined; and
the client communication component operative to escalate the message to an administrator account of the web page; receive a message response from the administrator account of the web page; and send the message response to the user.

12. The apparatus of claim 10, further comprising:
the interaction processing component operative to receive, from the NLP component, the first intent as the intent of the message, and compose the message response to include a text specified as the customization setting.

13. The apparatus of claim 10, further comprising:
the interaction processing component operative to compose the message response to include an indicator specifying that the message response comes from a page bot and not from a human operator.

14. The apparatus of claim 9, further comprising:
the bot setup component operative to identify that a second page field of the plurality of page fields of the web page contains insufficient data to populate a second variable field of the response to the first intent; provide a setup control element in for an intent associated with the second page field in the bot setting user interface; receive a selection of the setup control element; present a user interface to enable entry of data into the second page field; and save received data to the second page field.

15. A non-transitory computer-readable storage medium comprising instructions that, when executed, cause a system to:
receive a bot customization control directive at a page bot associated with a web page, the web page comprising a plurality of page fields;
present a bot setting user interface in response to the control directive;
receive a first control directive in the bot setting user interface to enable a response assistant component of the page bot;
receive a second control directive in the bot setting user interface to enable a response to a first intent, the response to include a variable field to be populated with data from a first page field of the plurality of the page fields of the web page;
receive a customization setting in the bot setting user interface to modify the enabled response to the first intent; and
save the customization setting for the response assistant component.

16. The computer-readable storage medium of claim 15, comprising further instructions that, when executed, cause a system to:
receive a message at the page bot from a client device;
request an intent of the message from a natural language processing (NLP) component;
determine whether the response assistant component is enabled to respond to the intent;
receive the data from the first page field of the web page;
compose the message response based at least in part on populating the variable field with the received data from the first page field of the web page; and
send the message response to the client device.

17. The computer-readable storage medium of claim 16, comprising further instructions that, when executed, cause a system to:
receive, from the NLP component, an intent error indicating that the intent of the message was not determined;
escalate the message to an administrator account of the web page;

receive a message response from the administrator account of the web page; and send the message response to the user.

18. The computer-readable storage medium of claim 16, comprising further instructions that, when executed, cause a system to:

receive, from the NLP component, the first intent as the intent of the message; and compose the message response to include a text specified as the customization setting.

19. The computer-readable storage medium of claim 16, comprising further instructions that, when executed, cause a system to:

compose the message response to include an indicator specifying that the message response comes from a page bot and not from a human operator.

20. The computer-readable storage medium of claim 15, comprising further instructions that, when executed, cause a system to:

identify that a second page field of the plurality of page fields of the web page contains insufficient data to populate a second variable field of the response to the first intent;

provide a setup control element in for an intent associated with the second page field in the bot setting user interface;

receive a selection of the setup control element;

present a user interface to enable entry of data into the second page field; and save received data to the second page field.

* * * * *